US010538120B2

(12) United States Patent
Oharuda et al.

(10) Patent No.: US 10,538,120 B2
(45) Date of Patent: Jan. 21, 2020

(54) METHOD FOR PRODUCING POLYVINYL ALCOHOL RESIN, AND POLYVINYL ALCOHOL RESIN OBTAINED BY THE METHOD

(71) Applicant: JAPAN VAM & POVAL CO., LTD., Osaka (JP)

(72) Inventors: Akinobu Oharuda, Osaka (JP); Masatoshi Kawanishi, Osaka (JP)

(73) Assignee: JAPAN VAM & POVAL CO., LTD., Osaka (JP)

( * ) Notice: Subject to any disclaimer, the term of this patent is extended or adjusted under 35 U.S.C. 154(b) by 715 days.

(21) Appl. No.: 15/029,684

(22) PCT Filed: Sep. 10, 2014

(86) PCT No.: PCT/JP2014/073895

§ 371 (c)(1),
(2) Date: Apr. 15, 2016

(87) PCT Pub. No.: WO2015/056505

PCT Pub. Date: Apr. 23, 2015

(65) Prior Publication Data

US 2016/0271988 A1 Sep. 22, 2016

(30) Foreign Application Priority Data

Oct. 18, 2013 (JP) ................................ 2013-217281

(51) Int. Cl.

| | |
|---|---|
| ***B41M 5/52*** | (2006.01) |
| ***B41M 5/323*** | (2006.01) |
| ***B41M 5/44*** | (2006.01) |
| ***C08F 216/06*** | (2006.01) |
| ***C09D 129/04*** | (2006.01) |
| ***C08L 29/04*** | (2006.01) |
| ***B41M 5/337*** | (2006.01) |
| ***B41M 5/50*** | (2006.01) |

(52) U.S. Cl.

CPC .......... *B41M 5/5254* (2013.01); *B41M 5/323* (2013.01); *B41M 5/3372* (2013.01); *B41M 5/44* (2013.01); *B41M 5/502* (2013.01); *C08F 216/06* (2013.01); *C08L 29/04* (2013.01); *C09D 129/04* (2013.01); *B41M 2205/04* (2013.01); *B41M 2205/40* (2013.01); *C08L 2201/54* (2013.01)

(58) Field of Classification Search

CPC ........................................................ B41M 5/00
See application file for complete search history.

(56) References Cited

U.S. PATENT DOCUMENTS 6,017,848 A 1/2000 Mando et al.

FOREIGN PATENT DOCUMENTS

| | | |
|---|---|---|
| EP | 0 899 126 | 3/1999 |
| EP | 2 644 403 | 10/2013 |
| JP | 5-17597 | 1/1993 |
| JP | 8-151412 | 6/1996 |
| JP | 10-287711 | 10/1998 |
| JP | 11-12424 | 1/1999 |
| JP | 11-314457 | 11/1999 |
| JP | 2000-15932 | 1/2000 |
| JP | 2000-177066 | 6/2000 |
| JP | 2000-265023 | 9/2000 |
| JP | 2000-281964 | 10/2000 |
| JP | 2002-146157 | 5/2002 |
| JP | 2003-277419 | 10/2003 |
| JP | 2006-281474 | 10/2006 |
| JP | 2007-136853 | 6/2007 |
| JP | 2011-215476 | 10/2011 |
| JP | 2013-39730 | 2/2013 |

OTHER PUBLICATIONS

International Preliminary Report on Patentability dated Apr. 19, 2016 in International Application No. PCT/JP2014/073895.

Extended European Search Report dated Mar. 28, 2017 in corresponding European Application No. 14854506.4.

Database CA [Online] Chemical Abstracts Service, Columbus, Ohio, US; Koharada, Akinobu et al., "Vinylalcohol polymer fiber aggregates with good water resistance", XP002767521, retrieved from STN Database accession No. 2013:279333, abstract.

Database CA [Online] Chemical Abstracts Service, Columbus, Ohio, US; Sato, Naoya et al., "Presensitized lithographic plate protective layer compositions containing alkoxylated butynediols", XP002767522, retrieved from STN Database accession No. 2011:1372287, abstract.

Database CA [Online] Chemical Abstracts Service, Columbus, Ohio, US; Kawanishi, Masatoshi et al., "Diacetone acrylamide-containing vinyl polymer resin compositions and transparent gel fragrances", XP002767523, retrieved from STN Database accession No. 2004:101232, abstract.

Database CA [Online] Chemical Abstracts Service, Columbus, Ohio, US; Akiyama, Mamoru et al., "One-component curable polymer compositions with excellent processability and water resistance", XP002767524, retrieved from STN Database accession No. 2000:503486, abstract.

Database CA [Online] Chemical Abstracts Service, Columbus, Ohio, US; Kasai, Masatoshi et al., "Aqueous emulsion compositions for adhesives", XP002767525, retrieved from STN Database accession No. 1998:795599, abstract.

International Search Report dated Nov. 25, 2014 in International Application No. PCT/JP2014/073895.

*Primary Examiner* — Scott R. Walshon
*Assistant Examiner* — Sathavaram I Reddy
(74) *Attorney, Agent, or Firm* — Wenderoth, Lind & Ponack, L.L.P.

(57) ABSTRACT

Provided is a method for producing a polyvinyl alcohol resin, comprising the steps of copolymerizing an aliphatic vinyl ester (A) with diacetone acrylamide (B), at least a part of which diacetone acrylamide (B) is added at a later stage, in the presence of a polymerization catalyst in an alcohol solvent, so that the ratio (a)/(b) of the polymerization yield at the end of the polymerization (a) to the polymerization yield at the end of the later addition (b) of diacetone acrylamide (B) is in the range of 1.01 to 1.10, and saponifying the resulting copolymer.

14 Claims, No Drawings

METHOD FOR PRODUCING POLYVINYL ALCOHOL RESIN, AND POLYVINYL ALCOHOL RESIN OBTAINED BY THE METHOD

TECHNICAL FIELD

The present invention relates to a method for producing a polyvinyl alcohol resin excellent in transparency and water resistance, a polyvinyl alcohol resin obtained by the production method, and the use thereof.

BACKGROUND ART

Polyvinyl alcohol (hereinafter polyvinyl alcohol may be abbreviated to "PVA") is known as a water-soluble synthetic polymer and used for various uses including a raw material for vinylon fiber, a coating and sizing agent for paper, a sizing agent for fibers, an adhesive for paper, a dispersion stabilizer for emulsion polymerization and suspension polymerization, a binder for inorganic substance such as a ceramic, a water soluble film, an optical film such as a polarizing film, and a medical material. PVA is also known to be eco-friendly and harmless to a living body.

In order to further expand the uses of PVA, attempts to modify PVA have been made. One example of such modification is introduction of a reactive carbonyl group into PVA, and in particular a polyvinyl alcohol resin having diacetone acrylamide introduced thereinto is known (hereinafter, polyvinyl alcohol resin may be abbreviated to "PVA resin").

PVA having diacetone acrylamide introduced thereinto (hereinafter, PVA having diacetone acrylamide introduced thereinto may be abbreviated to "DA-PVA resin") is used as a film easily soluble in cold water or a protection material for a light-sensitive flat printing plate because DA-PVA resin hardly suffers from decrease in water solubility resulting from hydrogen bonding between the hydroxyl groups. DA-PVA resin is also used as a protection layer for a thermal recording material, an ink-jet recording material, and a film, as well as an aqueous gel because DA-PVA resin can form a highly water resistant material through reaction of the reactive carbonyl groups present in the resin with a carbonyl-reactive crosslinking agent (Patent literature 1 to 8).

DA-PVA resin is thus used as the materials described above but sometimes is not sufficiently transparent in the form of an aqueous solution due to the reactive carbonyl groups contained therein, and has problems of, for example, unfavorable appearance resulting from decreased transparency in the form of a film or an aqueous gel, as well as of unfavorable effects on ink acceptability or color appearance, insufficient water resistance, etc.

CITATION LIST

Patent Literature

Patent literature 1: JP-08-151412 A
Patent literature 2: JP-2011-215476 A
Patent literature 3: JP-2000-15932 A
Patent literature 4: JP-11-314457 A
Patent literature 5: JP-2006-281474 A
Patent literature 6: JP-2007-136853 A
Patent literature 7: JP-2000-177066 A
Patent literature 8: JP-10-287711 A

SUMMARY OF INVENTION

Technical Problem

The present invention relates to a method for producing a polyvinyl alcohol resin capable of solving the above-mentioned problems, a polyvinyl alcohol resin obtained by the production method, and the use thereof.

Solution to Problem

The present inventors made extensive investigation and found that the problems described above can be solved by controlling, in copolymerizing an aliphatic vinyl ester (A) and diacetone acrylamide (B), the polymerization yield and the ratio for divided addition of the latter component. The present inventors conducted further examination and completed the present invention.

That is, the present invention relates to the following.

[1] A method for producing a polyvinyl alcohol resin, comprising the steps of copolymerizing an aliphatic vinyl ester (A) with diacetone acrylamide (B), at least a part of which diacetone acrylamide (B) is added at a later stage, in the presence of a polymerization catalyst in an alcohol solvent, so that the ratio (a)/(b) of the polymerization yield at the end of the polymerization (a) to the polymerization yield at the end of the later addition (b) of diacetone acrylamide (B) is in the range of 1.01 to 1.10, and saponifying the resulting copolymer.

[2] The method for producing a polyvinyl alcohol resin according to the above [1], wherein the weight ratio (c)/(d) of the amount of diacetone acrylamide (B) added at an earlier stage (c) to the amount of diacetone acrylamide (B) added at a later stage (d) is in the range of 0/100.0 to 15.0/85.0.

[3] The method for producing a polyvinyl alcohol resin according to the above [1] or [2], wherein the weight ratio of diacetone acrylamide (B) remaining after the polymerization calculated by the formula (e)/((e)+(f)) (where (e) is the amount of the remaining diacetone acrylamide (B) at the end of the polymerization and (f) is the amount of the remaining aliphatic vinyl ester (A) at the end of the polymerization) is 0.5% or less, and the resulting copolymer is saponified.

[4] The method for producing a polyvinyl alcohol resin according to any one of the above [1] to [3], wherein the aliphatic vinyl ester (A) is vinyl acetate.

[5] A polyvinyl alcohol resin obtained by the production method according to any one of the above [1] to [4].

[6] The polyvinyl alcohol resin according to the above [5], which has a diacetone acrylamide (B) unit content of 1.0 to 15.0 mol %, a saponification degree of 80.0 mol % or higher, a viscosity of 2.0 mPa·s or higher in a 4% aqueous solution, and a transparency of 90% or higher in a 4% aqueous solution.

[7] A coating agent containing the polyvinyl alcohol resin according to the above [5] or [6].

[8] A coated product obtained by coating a base material with the coating agent according to the above [7].

[9] A thermal recording material obtained by coating a base material with the coating agent according to the above [7].

[10] An ink-jet recording material obtained by coating a base material with the coating agent according to the above [7].

[11] A film containing the polyvinyl alcohol resin according to the above [5] or [6].

[12] An aqueous gel containing the polyvinyl alcohol resin according to the above [5] or [6].

Advantageous Effects of Invention

The polyvinyl alcohol resin obtained by the method for producing a polyvinyl alcohol resin of the present invention is highly transparent in the form of an aqueous solution, and therefore, when formed into a film or an aqueous gel, the polyvinyl alcohol resin is highly transparent and has a good appearance. In addition, when used for a thermal recording material or an ink-jet recording material, the polyvinyl alcohol resin improves ink acceptability and color appearance, and exhibits increased water resistance.

DESCRIPTION OF EMBODIMENTS

Hereafter, the method of the present invention for producing a polyvinyl alcohol resin and a polyvinyl alcohol resin obtained by the method will be described in detail.

The production method of the present invention is characterized in that, in a step of copolymerizing an aliphatic vinyl ester (A) with diacetone acrylamide (B), at least apart of which diacetone acrylamide (B) is added at a later stage, in the presence of a polymerization catalyst in an alcohol solvent, so that the ratio (a)/(b) of the polymerization yield at the end of the polymerization (a) to the polymerization yield at the end of the later addition (b) of diacetone acrylamide (B) is in the range of 1.01 to 1.10, and that the resulting copolymer is saponified. The calculation method of the polymerization yield used herein is as described later in Examples.

The aliphatic vinyl ester used in the present invention is not particularly limited, and examples thereof include vinyl formate, vinyl acetate, vinyl propionate, and vinyl pivalate. Among them, vinyl acetate is industrially preferable.

The alcohol solvent used in the present invention is not particularly limited, and examples thereof include alcohols, such as methanol, ethanol, n-propanol, and 2-propanol. Among them, methanol is industrially preferable.

The polymerization catalyst used in the present invention is not particularly limited, and an azo compound or a peroxide is usually used.

In the polymerization, an organic acid, for example, tartaric acid, citric acid, or acetic acid, may be added for the purpose of preventing the hydrolysis of the aliphatic vinyl ester.

In the step of copolymerizing the aliphatic vinyl ester and diacetone acrylamide in the presence of the polymerization catalyst in the alcohol solvent, at least a part of diacetone acrylamide is the amount of diacetone acrylamide added at an earlier stage. In the step, the ratio (a)/(b) of the polymerization yield at the end of the polymerization (a) to the polymerization yield at the end of the later addition (b) is preferably in the range of 1.01 to 1.10, more preferably in the range of 1.02 to 1.09, and still more preferably in the range of 1.03 to 1.08. When (a)/(b) is less than 1.01, unreacted diacetone acrylamide remains, which is not industrially preferable. In contrast, when (a)/(b) exceeds 1.10, diacetone acrylamide is used up and the aliphatic vinyl ester alone is polymerized. As a result, diacetone acrylamide cannot be uniformly introduced, and the water resistance is problematically decreased.

Also, in the step of copolymerization where at least a part of diacetone acrylamide is the amount of diacetone acrylamide added at an earlier stage, the weight ratio (c)/(d) of the amount of diacetone acrylamide added at an earlier stage (c) to the amount of diacetone acrylamide added at a later stage (d) is preferably in the range of 0/100.0 to 15.0/85.0, more preferably in the range of 1.0/99.0 to 13.0/87.0, and still more preferably in the range of 2.0/98.0 to 10.0/90.0. When the amount of diacetone acrylamide added at an earlier stage (c) of diacetone acrylamide exceeds 15.0, diacetone acrylamide cannot be uniformly introduced, and the transparency of an aqueous solution, the ink acceptability, the color appearance, and the water resistance are problematically impaired. The calculation method of the weight ratio of the amount of diacetone acrylamide added at a later stage used herein is as described later in Examples.

Furthermore, in the step of copolymerization, the weight ratio of diacetone acrylamide (B) remaining after the polymerization calculated by the formula (e)/((e)+(f)) (where (e) is the amount of the remaining diacetone acrylamide (B) at the end of the polymerization and (f) is the amount of the remaining aliphatic vinyl ester (A) at the end of the polymerization) is preferably 0.5% or less, more preferably 0.3% or less, and still more preferably 0.1% or less. When the weight ratio of the remaining diacetone acrylamide (e)/((e)+(f)) exceeds 0.5%, diacetone acrylamide remains in the production process, which is not industrially preferable. The calculation method of the weight ratio of the remaining diacetone acrylamide used herein is as described later in Examples.

In the step of the present invention of copolymerizing the aliphatic vinyl ester and diacetone acrylamide, at least a part of diacetone acrylamide is added at a later stage in the range defined herein. The method for the later addition is not particularly limited, and continuous addition or intermittent addition may be employed. Also, the speed of the addition during the polymerization may be changed, and the speed is not particularly limited as long as the effects of the present invention are not impaired.

In the copolymerization of the aliphatic vinyl ester and diacetone acrylamide in the present invention, the shape of the polymerization vessel, the type of the polymerization agitator, the polymerization temperature, the pressure in the polymerization vessel may be determined according to any known method. Also, the method for drying and pulverizing the saponified product is not particularly limited, and any known method may be employed. To terminate the polymerization, a polymerization inhibitor may be used although the use thereof is not essential. The polymerization inhibitor is not particularly limited, and examples thereof include m-dinitrobenzene etc.

In the copolymerization of the aliphatic vinyl ester and diacetone acrylamide in the present invention, as long as the effects of the present invention are not impaired, at least one kind of unsaturated monomers capable of copolymerizing with an unsaturated monomer having an aliphatic vinyl ester and diacetone acrylamide may be copolymerized together with the ingredients of the present invention. Examples of such unsaturated monomers include carboxyl group-containing unsaturated monomers, such as (meth)acrylic acid, maleic acid, maleic anhydride, fumaric acid, crotonic acid, itaconic acid, and undecylenic acid; unsaturated dibasic-acid monoalkyl esters, such as monomethyl maleate and monomethyl itaconate; amide group-containing unsaturated monomers, such as acrylamide, dimethylacrylamide, dimethylaminoethylacrylamide, diethylacrylamide, dimethylaminopropylacrylamide, isopropylacrylamide, N-methylolacrylamide, and N-vinylacetamide; vinyl halides, such as vinyl chloride and vinyl fluoride; glycidyl group-containing unsaturated monomers, such as allyl glycidyl ether and glycidyl methacrylate; 2-pyrrolidone ringcontaining unsaturated monomers, such as N-vinyl-2-pyrrolidone, N-vinyl-3-propyl-2-pyrrolidone, N-vinyl-5-methyl-2-pyrrolidone, N-vinyl-5,5-dimethyl-2-pyrrolidone, N-vinyl-3,5-dimethyl-2-pyrrolidone, and N-allyl-2-pyrrolidone; alkyl vinyl ethers, such as methyl vinyl ether, n-propyl vinyl ether, i-propyl vinyl ether, n-butyl vinyl ether, i-butyl vinyl ether, t-butyl vinyl ether, lauryl vinyl ether, dodecyl vinyl ether, and stearyl vinyl ether; nitriles, such as acrylonitrile and methacrylonitrile; hydroxyl group-containing unsaturated monomers, such as allyl alcohol, dimethyl allyl alcohol, isopropenyl allyl alcohol, hydroxyethyl vinyl ether, and hydroxybutyl vinyl ether; acetyl group-containing unsaturated monomers, such as allyl acetate, dimethylallyl acetate, and isopropenylallyl acetate; (meth)acrylic acid esters, such as methyl (meth)acrylate, ethyl (meth)acrylate, 2-ethylhexyl acrylate, and n-butyl acrylate; vinylsilanes, such as trimethoxyvinylsilane, tributylvinylsilane, and diphenylmethylvinylsilane; polyoxyalkylene (meth)acrylates, such as polyoxyethylene (meth)acrylate and polyoxypropylene (meth)acrylate; polyoxyalkylene (meth)acrylamides, such as polyoxyethylene (meth)acrylamide and polyoxypropylene (meth)acrylamide; polyoxyalkylene vinyl ethers, such as polyoxyethylene vinyl ether and polyoxypropylene vinyl ether; polyoxyalkylene alkylvinyl ethers, such as polyoxyethylene allyl ether, polyoxypropylene allyl ether, polyoxyethylene butylvinyl ether, and polyoxypropylene butylvinyl ether; α-olefins, such as ethylene, propylene, n-butene, and 1-hexene; butenes, such as 3,4-dihydroxy-1-butene, 3,4-diacyloxy-1-butene, 3-acyloxy-4-hydroxy-1-butene, 4-acyloxy-3-hydroxy-1-butene, and 3,4-diacyloxy-2-methyl-1-butene; pentenes, such as 4,5-dihydroxy-1-pentene, 4,5-diacyloxy-1-pentene, 4,5-dihydroxy-3-methyl-1-pentene, and 4,5-diacyloxy-3-methyl-1-pentene; hexenes, such as 5,6-dihydroxy-1-hexene and 5,6-diacyloxy-1-hexene; amine unsaturated monomers, such as N,N-dimethylallylamine, N-allylpiperazine, 3-piperidine acrylic acid ethyl ester, 2-vinylpyridine, 4-vinylpyridine, 2-methyl-6-vinylpyridine, 5-ethyl-2-vinylpyridine, 5-butenylpyridine, 4-pentenylpyridine, and 2-(4-pyridyl)allyl alcohol; quaternary ammonium compound-containing unsaturated monomers, such as dimethylaminoethyl acrylate methyl chloride quaternary salt, N,N-dimethylaminopropylacrylamide methyl chloride quaternary salt, and N,N-dimethylaminopropylacrylamide methyl benzenesulfonate quaternary salt; aromatic unsaturated monomers, such as styrene; sulfonic acid group-containing unsaturated monomers, such as 2-acrylamide-2-methylpropanesulfonic acid or its alkali metal salt, ammonium salt or organic amine salt, 2-acrylamide-1-methylpropanesulfonic acid or its alkali metal salt, ammonium salt or organic amine salt, 2-methacrylamide-2-methylpropanesulfonic acid or its alkali metal salt, ammonium salt or organic amine salt, vinyl sulfonic acid or its alkali metal salt, ammonium salt or organic amine salt, allyl sulfonic acid or its alkali metal salt, ammonium salt or organic amine salt, and methallyl sulfonic acid or its alkali metal salt, ammonium salt or organic amine salt; glycerol monoallyl ether; 2,3-diacetoxy-1-allyloxypropane; 2-acetoxy-1-allyloxy-3-hydroxypropane; 3-acetoxy-1-allyloxy-3-hydroxypropane; 3-acetoxy-1-allyloxy-2-hydroxypropane; glycerol monovinyl ether; glycerol monoisopropenyl ether; acryloyl morpholine; and vinyl ethylene carbonate. In addition, the obtained modified PVA may be further post-modified by reactions, such as acetalization, urethanation, etherification, graftation, phosphorylation, acetoacetylation, and cationization, as long as the effects of the present invention are not impaired.

For the saponification of the copolymer of the aliphatic vinyl ester and diacetone acrylamide of the present invention, known methods of alkali saponification or acid saponification may be applied. In particular, industrially preferred is a method in which alcoholysis is performed by adding an alkali hydroxide to a solution of the copolymer in methanol or a mixed solvent of methanol, water, methyl acetate, benzene, etc.

The diacetone acrylamide unit content in the DA-PVA resin of the present invention is preferably 1.0 to 15.0 mol %, more preferably 1.5 to 12.0 mol %, and still more preferably 2.0 to 10.0 mol %. When the diacetone acrylamide unit content is lower than 1.0 mol %, sufficient water resistance cannot be achieved, and when the unit content is higher than 15.0 mol %, water solubility is decreased. Thus, such a too low or too high content is not preferred.

The saponification degree of the DA-PVA resin of the present invention is preferably 80.0 mol % or higher, more preferably 85.0 mol % or higher, and still more preferably 88.0 mol % or higher.

The DA-PVA resin of the present invention is used in the form of an aqueous solution, and the viscosity of the aqueous solution may be varied. The viscosity of a 4 mass % aqueous solution is preferably 2.0 mPa·s or higher, more preferably 3.0 mPa·s or higher, and still more preferably 5.0 mPa·s or higher.

Furthermore, the transparency of a 4 mass % aqueous solution of the DA-PVA resin of the present invention is preferably 90% or higher, more preferably 92% or higher, and still more preferably 94% or higher. When the 4 mass % aqueous solution transparency is lower than 90%, the aqueous solution is less transparent and cloudy, having unfavorable appearance.

The saponification degree, the 4 mass % aqueous solution viscosity, and the 4 mass % aqueous solution transparency were measured according to JIS K-6726 (1994).

The DA-PVA resin of the present invention may contain a crosslinking agent blended thereinto as needed. The crosslinking agent is not particularly limited as long as it has a functional group reactive with a carbonyl group in the diacetone acrylamide unit. In particular, preferred are compounds having 2 or more functional groups of one or more kinds selected from the group consisting of hydrazino represented by the following formula (1) —NH—$NH_2$, hydrazide represented by the following formula (2) —CO—NH—$NH_2$, and semicarbazide represented by the following formula (3) —NH—CO—NH—$NH_2$.

Specific examples of the crosslinking agent include multifunctional hydrazine and multifunctional hydrazide compounds, such as carbohydrazide, oxalic dihydrazide, malonic dihydrazide, succinic dihydrazide, glutaric dihydrazide, adipic dihydrazide, pimelic dihydrazide, suberic dihydrazide, azelaic dihydrazide, sebacic dihydrazide, dodecane dihydrazide, hexadecane dihydrazide, terephthalic dihydrazide, isophthalic dihydrazide, 2,6-naphthoic dihydrazide, 4,4'-bisbenzene dihydrazide, 1,4-cyclohexanedihydrazide, tartaric dihydrazide, malic dihydrazide, iminodiacetic dihydrazide, itaconic dihydrazide, 1,3-bis(hydrazinocarbonoethyl)-5-isopropylhydantoin, 7,11-octadecadiene-1,18-dicarbohydrazide, ethylenediaminetetraacetic tetrahydrazide, citric trihydrazide, butanetricarbohydrazide, 1,2,3-benzene trihydrazide, 1,4,5,8-naphthoic tetrahydrazide, nitriloacetic trihydrazide, cyclohexanetricarboxylic trihydrazide, pyromellitic tetrahydrazide, and N-amino polyacrylamide; and multifunctional semicarbazide compounds, such as N,N'-hexamethylene bissemicarbazide, and biuretly-tri(hexamethylenesemicarbazide). The examples also include multifunctional hydrazine derivatives, multifunctional hydrazide derivatives, and multifunctional semicarbazide derivatives obtained by reactions between these compounds and low boiling point ketones, such as acetone and methylethylketone.

The above-mentioned crosslinking agents may be used alone or in combination of two or more kinds thereof, and the amount of the crosslinking agent to be added is preferably 1 to 30 parts by mass, more preferably 2 to 20 parts by mass, and still more preferably 3 to 15 parts by mass relative to 100 parts by mass of the DA-PVA resin. When the amount of the crosslinking agent is too small, the water resistance is decreased and aqueous gel formation cannot be achieved. In contrast, when the amount of the crosslinking agent is too large, leaching out of the unreacted crosslinking agent may decrease the water resistance.

In order to add the crosslinking agent to the DA-PVA resin of the present invention, usually the crosslinking agent or an aqueous solution thereof is added to and mixed with an aqueous solution of the DA-PVA resin prepared beforehand. The aqueous solution of the DA-PVA resin can be prepared by the conventionally known method for dissolving polyvinyl alcohol, that is, dispersing the DA-PVA resin in water at room temperature, raising the temperature to 80° C. or higher with stirring, and after complete dissolution, cooling the solution. It is allowable that a solid crosslinking agent is added to an aqueous solution of the DA-PVA resin, but for more homogenous reaction, a method in which an aqueous solution of the crosslinking agent prepared beforehand is added to an aqueous solution of the DA-PVA resin is preferred.

The viscosity of the aqueous solution prepared by adding the crosslinking agent to an aqueous solution of the DA-PVA resin of the present invention increases over time. If the duration before use is relatively short, problems may not occur. However, if longer time elapses, the aqueous solution becomes too viscous for use and may cause a pot life problem due to gelation. To prevent such problems, a basic compound is allowed to coexist in the aqueous solution. The substance to be added for the above-mentioned purpose may be any substance as long as it raises the pH of the aqueous solution (to 7.5 or higher), but preferred are water-soluble organic amines and ammonia for the reason that these have a strong inhibitory effect on the reaction between the DA-PVA resin and the crosslinking agent and that these volatilize during drying and therefore do not impair the water resistance.

Examples of the water-soluble basic compound include, in addition to water-soluble organic amines and ammonia, hydroxides of alkali metals, such as sodium hydroxide and potassium hydroxide; hydroxides of alkaline earth metals, such as calcium hydroxide; etc. As the water-soluble organic amine, one or more kinds selected from, for example, primary alkanolamines, such as monoethanolamine, aminoethylethanolamine, monoisopropanolamine, N-(2-hydroxypropyl)-ethylenediamine, 2-amino-1-butanol, 2-amino-2-methyl-1-propanol, 3-amino-1-propanol, 2-amino-2-methyl-1,3-propanediol, 2-amino-2-ethyl-1,3-propanediol, and tris(hydroxyethyl)-aminomethane; secondary alkanolamines, such as diethanolamine, methylethanolamine, butylmethanolamine, N-acetylethanolamine, and diisopropanolamine; tertiary alkanolamines, such as triethanolamine, methyldiethanolamine, dimethylethanolamine, diethylethanolamine, ethyldiethanolamine, and triisopropanolamine; primary alkylamines, such as methylamine, ethylamine, isobutylamine, t-butylamine, and cyclohexylamine; secondary alkylamines, such as dimethylamine, diethylamine, and diisopropylamine; and tertiary alkylamines, such as trimethylamine may be used.

The method for adding the water-soluble basic compound is not particularly limited. Usually, the water-soluble basic compound is added to and mixed with an aqueous solution of the DA-PVA resin, and then the crosslinking agent is added. In an alternative method, the crosslinking agent is added to an aqueous solution of the DA-PVA resin, and the solution is left stand for a certain time period, and then after the viscosity of the solution reaches a desired level as a result of crosslinking reaction, the water-soluble basic compound is added. The amount of the water-soluble basic compound to be added is not particularly limited, and is preferably 0.01 to 10 parts by mass, and more preferably 0.05 to 5 parts by mass relative to 100 parts by mass of the DA-PVA resin.

When a coating agent containing the DA-PVA resin of the present invention is applied onto a base material for the production of a thermal recording material, the resin is used as a binder resin of a protection layer, a thermal recording layer, an undercoat layer, or a backcoat layer of the thermal recording material. In addition, the resin is also used as a dispersion binder for a leuco dye or a developer in the thermal recording layer. The resin is preferably used for, in particular, a protection layer, a thermal recording layer, and a backcoat layer, but the DA-PVA resin can be used for thermal recording materials without any limitation.

In the capes where the DA-PVA resin of the present invention is used for a protection layer, a thermal recording layer, or a backcoat layer of a thermal recording material, by using a crosslinking agent in combination, a thermal recording material excellent in water resistance, solvent resistance, and color appearance can be obtained.

In the cases where the DA-PVA resin of the present invention is used for a protection layer, various kinds of fillers, polymers, and latexes may be used in combination, in addition to a crosslinking agent, as long as the effects of the present invention are not impaired.

Specific examples of the filler include silicates, such as silicon dioxide, calcium silicate, magnesium silicate, aluminum silicate, zinc silicate, and amorphous silica; zinc oxide, aluminum oxide, titanium dioxide, aluminium hydroxide, barium sulfate, aluminum sulfate, talc, clay, magnesium oxide, magnesium hydroxide, calcium carbonate, magnesium carbonate, nylon filler, styrene-methacrylate copolymer filler, styrene-butadiene copolymer filler, styrene-butadiene-acrylic copolymer filler, polystyrene filler, urea-formalin filler, starch powder, etc.

Specific examples of the polymer include celluloses, such as methyl cellulose, ethyl cellulose, carboxymethyl cellulose, hydroxymethyl cellulose, and hydroxyethyl cellulose; gelatin, casein, sodium alginate, poly(meth)acrylamide and its copolymer, polyvinylpyrrolidone and its copolymer, polyacrylic acid and its salt, etc.

Specific examples of the latex include emulsions of polyvinyl acetate, polyurethane, polyacrylic acid, polyacrylic ester, vinyl chloride-vinyl acetate copolymer, ethylene-vinyl acetate copolymer, etc.

The DA-PVA resin of the present invention is suitable as a dispersion binder for a leuco dye or a developer used in a thermal recording layer. The leuco dye is not particularly limited and may be appropriately selected, depending on the purpose, from those used for thermal recording materials, and examples thereof include triphenylmethane dyes, fluoran dyes, phenothiazine dyes, auramine dyes, spiropyran dyes, indolinophthalide dyes, etc.

Specific examples of the leuco dye include 2-anilino-3-methyl-6-dibutylaminofluoran, 3,3-bis(p-dimethylamino-phenyl)-phthalide, 3,3-bis(p-dimethylaminophenyl)-6-dimethylaminophthalide (or Crystal Violet Lactone), 3,3-bis(p-dimethylaminophenyl)-6-diethylaminophthalide, 3,3-bis(p-dimethylaminophenyl)-6-chlorophthalide, 3,3-bis(p-dibutylaminophenyl)phthalide, 3-cyclohexylamino-6-chlorofluoran, 3-dimethylamino-5,7-dimethylfluoran, 3-diethylamino-7-chlorofluoran, 3-diethylamino-7-methylfluoran, 3-diethylamino-7,8-benzfluoran, 3-diethylamino-6-methyl-7-chlorofluoran, 3-(N-p-tolyl-N-ethylamino)-6-methyl-7-anilinofluoran, 2-[N-(3'-trifluoromethylpheny) amino]-6-diethylaminofluoran, 2-[3,6-bis(diethylamino)-9-(o-chloroanilino)xanthylbenzoic acid lactam], 3-diethylamino-6-methyl-7-(m-trichloromethylanilino)fluoran, 3-diethylamino-7-(o-chloroanilino)fluoran, 3-pyrrolidino-6-methyl-7-anilinofluoran, 3-di-n-buthylamino-7-(o-chloroanilino)fluoran, 3-N-methyl-N,n-amylamino-6-methyl-7-anilinofluoran, 3-N-methyl-N-cyclohexylamino-6-methyl-7-anilinofluoran, 3-diethylamino-6-methyl-7-anilinofluoran, 3-(N,N-diethylamino)-5-methyl-7-(N,N-dibenzylamino)fluoran, benzoyl leuco methylene blue, 6'-chloro-8'-methoxy-benzoindolino-spiropyran, 6'-bromo-3'-methoxy-benzoindolino-spiropyran, 3-(2'-hydroxy-4'-dimethylaminophenyl)-3-(2'-methoxy-5'-chlorophenyl)phthalide, 3-(2'-hydroxy-4'-dimethylaminopheny)-3-(2'-methoxy-5'-nitrophenyl)phthalide, 3-(2'-hydroxy-4'-diethylaminophenyl)-3-(2'-methoxy-5'-methylphenyl) phthalide, 3-(2'-methoxy-4'-dimethylaminophenyl)-3-(2'-hydroxy-4'-chloro-5'-methylphenyl)phthalide, 3-(N-ethyl-N-tetrahydrofurfuryl)amino-6-methyl-7-anilinofluoran, 3-N-ethyl-N-(2-ethoxypropyl)amino-6-methyl-7-anilino-fluoran, 3-N-methyl-N-isobutyl-6-methyl-7-anilinofluoran, 3-morpholino-7-(N-propyl-trifluoromethylanilino)fluoran, 3-pyrrolidino-7-trifluoromethylanilinofluoran, 3-diethylamino-5-chloro-7-(N-benzyl-trifluoromethylanilino) fluoran, 3-pyrrolidino-7-(di-p-chlorophenyl)methylaminofluoran, 3-diethylamino-5-chloro-7-(α-phenylethylamino) fluoran, 3-(N-ethyl-p-toluidino)-7-(α-phenylethylamino) fluoran, 3-diethylamino-7-(o-methoxycarbonylphenylamino)fluoran, 3-diethylamino-5-methyl-7-(α-phenylethylamino)fluoran, 3-diethylamino-7-piperidinofluoran, 2-chloro-3-(N-methyltoluidino)-7-(p-n-butylanilino)fluoran, 3-di-n-buthylamino-6-methyl-7-anilinofluoran, 3,6-bis(dimethylamino)fluorenespiro(9,3')-6'-dimethylaminophthalide, 3-(N-benzyl-N-cyclohexylamino)-5,6-benzo-7-α-naphthylamino-4'-bromofluoran, 3-diethylamino-6-chloro-7-anilinofluorane, 3-diethylamino-6-methyl-7-mesidino-4',5'-benzofluoran, 3-N-methyl-N-isopropyl-6-methyl-7-anilinofluoran, 3-N-ethyl-N-isoamyl-6-methyl-7-anilinofluoran, 3-diethylamino-6-methyl-7-(2',4'-dimethylanilino)fluoran, 3-morpholino-7-(N-propyl-trifluoromethylanilino)fluoran, 3-pyrrolidino-7-trifluoromethylanilinofluoran, 3-diethylamino-5-chloro-7-(N-benzyl-trifluoromethylanilino) fluoran, 3-pyrrolidino-7-(di-p-chlorophenyl)methylaminofluoran, 3-diethylamino-5-chloro-(α-phenylethylamino)fluoran, 3-(N-ethyl-p-toluidino)-7-(α-phenylethylamino)fluoran, 3-diethylamino-7-(o-methoxycarbonylphenylamino)fluoran, 3-diethylamino-5-methyl-7-(α-phenylethylamino)fluoran, 3-diethylamino-7-piperidinofluoran, 2-chloro-3-(N-methyltoluidino)-7-(p-N-butylanilino)fluoran, 3,6-bis (dimethylamino)fluorenespiro(9,3')-6'-dimethylaminophthalide, 3-(N-benzyl-N-cyclohexylamino)-5,6-benzo-7-α-naphthylamino-4'-bromofluoran, 3-diethylamino-6-chloro-7-anilinofluorane, 3-N-ethyl-N-(2-ethoxypropyl)amino-6-methyl-7-anilinofluoran, 3-N-ethyl-N-tetrahydrofurfurylamino-6-methyl-7-anilinofluoran, 3-diethylamino-6-methyl-7-mesidino-4',5'-benzofluoran, 3-(p-dimethylaminophenyl)-3-[1,1-bis(p-dimethylaminophenyl)ethylen-2-yl]-phthalide, 3-(p-dimethylaminophenyl)-3-[1,1-bis(p-dimethylaminophenyl) ethylen-2-yl]-6-dimethylaminophthalide, 3-(p-dimethylaminophenyl)-3-(1-p-dimethylaminophenyl-1-phenylethylene-2-yl)phthalide, 3-(p-dimethylaminophenyl)-3-(1-p-dimethylaminophenyl-1-p-chlorophenylethylene-2-yl)-6-dimethylaminophthalide, 3-(4'-dimethylamino-2'-methoxy)-3-(1'-p-dimethylaminophenyl-1'-p-chlorophenyl-1',3'-butadien-4'-yl)benzophthalide, 3-(4'-dimethylamino-2'-benzyloxy)-3-(1'-p-dimethylaminophenyl-1'-phenyl-1',3'-butadien-4'-yl)benzophthalide, 3-dimethylamino-6-dimethylamino-fluorene-9-spiro-3'-(6'-dim ethylamino) phthalide, 3,3-bis(2-(p-dimethylaminophenyl)-2-p-methoxyphenyl)ethenyl)-4,5,6,7-tetrachlorophthalide, 3-bis [1,1-bis(4-pyrrolidinophenyl)ethylen-2-yl]-5,6-dichlor o-4, 7-dibromophthalide, bis(p-dimethylaminostyryl)-1-naphthalenesulfonylmethane, and bis(p-dimethylaminostyryl)-1-p-tolylsulfonylmethane.

These leuco dyes may be used alone or in combination of two or more kinds thereof.

The above-mentioned developer is not particularly limited and can be appropriately selected, depending on the purpose, from those used for thermal recording materials. Examples of the developer include 4,4'-isopropylidenebisphenol, 4,4'-isopropylidenebis(o-methylphenol), 4,4'-sec-butylidenebisphenol, 4,4'-isopropylidenebis(2-tert-butylphenol), zinc p-nitrobenzoate, 1,3,5-tris(4-tert-butyl-3-hydroxy-2,6-dimethylbenzyl)isocyanuric acid, 2,2-(3,4'-dihydroxydiphenyl)propane, bis(4-hydroxy-3-methylphenyl)sulfide, 4-[β-(p-methoxyphenoxy)ethoxy] salicylic acid, 1,7-bis(4-hydroxyphenylthio)-3,5-dioxaheptane, 1,5-bis(4-hydroxyphenylthio)-5-oxapentane, monocalcium salt of monobenzylphthalate, 4,4'-cyclohexylidenediphenol, 4,4'-isopropylidenebis(2-chlorophenol), 2,2'-methylenebis(4-methyl-6-tert-butylphenol), 4,4'-butylidenebis(6-tert-butyl-2-methyl)phenol, 1,1,3-tris(2-methyl-4-hydroxy-5-tert-butylphenyl)butane, 1,1,3-tris(2-methyl-4-hydroxy-5-cyclohexylphenyl)butane, 4,4'-thiobis(6-tert-butyl-2-methyl)phenol, 4,4'-diphenol sulfone, 4-isopropoxy-4'-hydroxydiphenylsulfone (4-hydroxy-4'-isopropoxydiphenylsulfone), 4-benzyloxy-4'-hydroxydiphenylsulfone, 4,4'-diphenolsulfoxide, isopropyl p-hydroxybenzoate, benzyl p-hydroxybenzoate, benzyl protocatechuate, stearyl gallate, lauryl gallate, octyl gallate, 1,3-bis(4-hydroxyphenylthio)-propane, N,N'-diphenylthiourea, N,N'-di(m-chlorophenyl)thiourea, salicylanilide, bis-(4-hydroxyphenyl)acetic acid methyl ester, bis-(4-hydroxyphenyl)acetic acid benzyl ester, 1,3-bis(4-hydroxycumyl) benzene, 1,4-bis(4-hydroxycumyl)benzene, 2,4'-diphenolsulfone, 2,2'-diallyl-4,4'-diphenolsulfone, 3,4-dihydroxyphenyl-4'-methyldiphenylsulfone, zinc 1-acetyloxy-2-naphthoate, zinc 2-acetyloxy-1-naphthoate, zinc 2-acetyloxy-3-naphthoate, α,α-bis(4-hydroxyphenyl)-α-methyltoluene, antipyrine complex of zinc thiocyanate, tetrabromobisphenol A, tetrabromobisphenol S, 4,4'-thiobis (2-methylphenol), and 4,4'-thiobis(2-chlorophenol). These developers may be used alone or in combination of two or more kinds thereof.

In the cases where the DA-PVA resin of the present invention is used for a thermal recording material, known materials may be used in combination with the DA-PVA resin in the thermal recording layer, the undercoat layer, and/or the backcoat layer without particular limitation as long as the effects of the present invention are not impaired.

In the cases where a coating agent containing the DA-PVA resin of the present invention is applied onto a base material for the production of an inkjet recording material, the DA-PVA resin of the present invention is preferably used as a binder resin for an ink accepting layer, and when water resistance is required, the DA-PVA resin can be used in combination with a crosslinking agent. As long as the effects of the present invention are not impaired, other resins may also be used in combination. The production method may be selected from publicly known methods, but usable methods are not limited thereto.

In addition, in the cases where the DA-PVA resin of the present invention is used as a binder resin for an ink accepting layer of an inkjet recording material, a filler used for the ink accepting layer may be, for example, porous inorganic fine particles.

Specific examples of the porous inorganic fine particles include white inorganic pigments and inorganic sols, such as wet synthetic silica, colloidal silica, vapor phase silica, light calcium carbonate, heavy calcium carbonate, kaolin, talc, calcium sulfate, barium sulfate, titanium dioxide, zinc oxide, zinc carbonate, satin white, aluminum silicate, diatomaceous earth, calcium silicate, magnesium silicate, tin-oxide sol, cerium oxide sol, lanthanum oxide sol, titanium oxide sol, neodymium oxide sol, yttrium oxide sol, colloidal alumina, quasi-boehmite alumina, vapor phase alumina, aluminium hydroxide, alumina, lithopone, zeolite, hydrated halloysite, magnesium carbonate, and magnesium hydroxide, and these may be used alone or in combination of two or more kinds depending on the purpose.

The particle size of the porous inorganic fine particles is not particularly limited and is appropriately selected depending on the type of the inorganic fine particles to be used. For example, preferred mean particle size is 1 to 12 μm in the case of wet synthetic silica, 5 to 100 nm in the case of colloidal silica, and 30 nm or less in the case of vapor phase alumina and quasi-boehmite alumina.

A film containing the DA-PVA resin of the present invention is suitable as a film easily soluble in cold water. The production method may be selected from publicly known methods, but usable methods are not limited thereto.

The film easily soluble in cold water may contain, for example, a water soluble polymer, such as PVA, starch, a cellulose derivative, polyacrylic acid or its alkali metal salt, or an aqueous emulsion or a suspension thereof, or a pigment, such as clay or titanium oxide, as long as the effects of the present invention are not impaired, and a plasticizer may be added thereto as needed. Specific examples of the plasticizer include, for example, glycerol compounds, such as glycerol, diglycerol, and polyglycerol; polyoxyalkylene adducts, such as polyethylene glycol and polypropylene glycol; glycol compounds, such as trimethylolpropane, ethylene glycol, diethylene glycol, propylene glycol, triethylene glycol, and polyethylene glycol and derivatives thereof; and triethanolamine, triethanolamine acetate, etc.

The film easily soluble in cold water, which film contains the DA-PVA resin of the present invention, is highly transparent and highly soluble in cold water because of uniform introduction of diacetone acrylamide.

A film containing the DA-PVA resin of the present invention is, when a crosslinking agent is contained in combination, suitable as a gas barrier film. The production method may be selected from publicly known methods, but usable methods are not limited thereto.

In the gas barrier film, as long as the effects of the present invention are not impaired, PVA, starch, a cellulose derivative, such as methylcellulose and carboxymethyl cellulose, a polyacrylic acid derivative, another natural or synthetic polymer such as gelatin, an inorganic filler, such as clay, kaolin, talc, silica, and calcium carbonate, a plasticizer, such as glycerol and sorbitol, a surfactant, an antifoam, an antistatic agent, a chelating agent, or the like can be used in combination.

The DA-PVA resin of the present invention is, when a crosslinking agent is used in combination, suitable as an aqueous gel.

The aqueous gel can be used as a fragrance, a deodorizer, a refrigerant, a shock absorbing material, or a material for immobilization of an enzyme or a microorganism, and is highly transparent because of uniform introduction of diacetone acrylamide.

The DA-PVA resin of the present invention can appropriately be used for various uses taking advantage of uniform introduction of diacetone acrylamide. Specific examples of the use include a protection layer for a light-sensitive flat printing plate, a surface coating agent for a metal or resin, a textile finishing agent, a nonwoven fabric binder, a ceramic binder, an adhesive for paper etc., a fiber assembly, such as nanofiber, a dispersing agent for emulsion polymerization, an anticlouding agent, a binder for a building material, a dispersion stabilizer for suspension polymerization, etc.

In addition, the DA-PVA resin of the present invention can be acetalized, and such an acetalized resin is suitable for various uses, such as dispersing agents for inks etc., photosensitive materials, safety glass films, ceramic binders, etc.

The present invention encompasses embodiments in which various structures described above are combined within the technical scope of the present invention in such a manner that the effects of the present invention are exerted.

EXAMPLES

Hereinafter, the present invention will be illustrated in more detail by Examples, but it is not limited thereto. Various modifications can be made within the technical idea of the present invention by those with ordinary skill in the art. Herein, "part" and "%" express "part by mass" and "% by mass" unless otherwise stated.

Also, evaluations of physical properties in Examples were conducted as follows.

(1) Remaining diacetone acrylamide was calculated from the integrated area of the corresponding peaks obtained by $^{1}$H-NMR measurement using $CDCl_3$ as a solvent.

(2) Residual vinyl acetate was calculated from the integrated area of the corresponding peaks obtained by $^{1}$H-NMR measurement using $CDCl_3$ as a solvent.

(3) Polymerization yield was calculated based on the solid content of each polymerization paste in an absolutely dried state. The polymerization yield was obtained as the product of the solid content and the yield coefficient calculated by the formula shown below. In the cases where diacetone acrylamide remained in the solid content, the residual amount was calculated from the integrated area of the corresponding peaks obtained by $^{1}$H-NMR measurement using $CDCl_3$ as a solvent, and subtracted from the solid content.

Yield coefficient=total amount of ingredients/total amount of monomers*

* "Monomers" means the aliphatic vinyl ester (vinyl acetate) and diacetone acrylamide.

(4) Viscosity of a 4% aqueous solution was measured according to JIS K-6726 (1994).

(5) Saponification degree was measured according to JIS K-6726 (1994).

(6) Transparency of a 4% aqueous solution was measured according to JIS K-6726 (1994).

(7) Diacetone acrylamide unit content was calculated from the integrated area of the corresponding peaks obtained by $^1$H-NMR measurement using DMSO-d6 as a solvent.

Example 1

Into a flask equipped with a stirrer, a thermometer, a dropping funnel, and a reflux condenser, 2000 parts of vinyl acetate, 604 parts of methanol, and 8.2 parts of diacetone acrylamide were placed. After nitrogen replacement of the system, the internal temperature was raised to 60° C. After that, a solution of 1.2 parts of 2,2-azobisisobutyronitrile in 100 parts of methanol was added to the system to start polymerization. While nitrogen circulation was continued, a solution of 127.8 parts of diacetone acrylamide in 80 parts of methanol was added dropwise at a constant rate from immediately after the start of the polymerization. At the end of the polymerization, m-dinitrobenzene as a polymerization inhibitor was added to stop the polymerization. The polymerization yield at the end of the later addition of diacetone acrylamide was 70.2%, and the yield at the end of the polymerization was 73.8%. The ratio (a)/(b) of the polymerization yield at the end of the polymerization (a) to the polymerization yield at the end of the later addition of diacetone acrylamide (b) was 1.05. The weight ratio of the diacetone acrylamide remaining after the polymerization calculated by the formula (e)/((e)+(f)) (where (e) is the amount of the remaining diacetone acrylamide at the end of the polymerization and (f) is the amount of the remaining aliphatic vinyl ester at the end of the polymerization) was less than 0.1%. The weight ratio (c)/(d) of the amount of diacetone acrylamide added at an earlier stage (c) to the amount of diacetone acrylamide added at a later stage (d) was 6.0/94.0.

The obtained reaction mixture was subjected to removal of the remaining vinyl acetate by distillation by continuous addition of methanol vapor, and thus a 50% solution of a diacetone acrylamide-vinyl acetate copolymer in methanol was obtained. To 500 parts of this solution, 70 parts of methanol, 2 parts of ion-exchange water, and 15 parts of a 4% solution of sodium hydroxide in methanol were added and thoroughly mixed, and saponification was allowed to proceed at 45° C. The obtained gelatinous material was pulverized, thoroughly washed with methanol, and dried to give a DA-PVA resin (DA-PVA1). Regarding the obtained DA-PVA1, the viscosity of a 4% aqueous solution was 20.5 mPa·s, the saponification degree was 98.6 mol %, and the transparency of the 4% aqueous solution was 97.8%. The diacetone unit content of DA-PVA1 was 4.6 mol %.

Example 2

In the same manner as in Example 1 except that the saponification conditions were changed, the DA-PVA resin (DA-PVA2) shown in Table 1 was obtained. Regarding the obtained DA-PVA2, the viscosity of a 4% aqueous solution was 19.8 mPa·s, the saponification degree was 92.4 mol %, and the transparency of the 4% aqueous solution was 96.8%. The diacetone unit content of DA-PVA2 was 4.6 mol %.

Example 3

Into a flask equipped with a stirrer, a thermometer, a dropping funnel, and a reflux condenser, 2500 parts of vinyl acetate, 589 parts of methanol, and 15.6 parts of diacetone acrylamide were placed. After nitrogen replacement of the system, the internal temperature was raised to 60° C. After that, a solution of 1.5 parts of 2,2-azobisisobutyronitrile in 100 parts of methanol was added to the system to start polymerization. While nitrogen circulation was continued, a solution of 207.4 parts of diacetone acrylamide in 170 parts of methanol was added dropwise at a constant rate from immediately after the start of the polymerization. At the end of the polymerization, m-dinitrobenzene as a polymerization inhibitor was added to stop the polymerization. The polymerization yield at the later addition of diacetone acrylamide was 69.1%, and the yield at the end of the polymerization was 71.3%. The ratio (a)/(b) of the polymerization yield at the end of the polymerization (a) to the polymerization yield at the end of the later addition (b) was 1.03. The weight ratio of the diacetone acrylamide remaining after the polymerization calculated by the formula (e)/((e)+(f)) (where (e) is the amount of the remaining diacetone acrylamide at the end of the polymerization and (f) is the amount of the remaining aliphatic vinyl ester at the end of the polymerization) was less than 0.1%. The weight ratio (c)/(d) of the amount of diacetone acrylamide added at an earlier stage (c) to the amount of diacetone acrylamide added at a later stage (d) was 7.0/93.0.

The obtained reaction mixture was subjected to removal of the remaining vinyl acetate by distillation by continuous addition of methanol vapor, and thus a 48% solution of a diacetone acrylamide-vinyl acetate copolymer in methanol was obtained. To 500 parts of this solution, 70 parts of methanol, 2 parts of ion-exchange water, and 14 parts of a 4% solution of sodium hydroxide in methanol were added and thoroughly mixed, and saponification was allowed to proceed at 45° C. The obtained gelatinous material was pulverized, thoroughly washed with methanol, and dried to give a DA-PVA resin (DA-PVA3). Regarding the obtained DA-PVA3, the viscosity of a 4% aqueous solution was 21.5 mPa·s, the saponification degree was 98.4 mol %, and the transparency of the 4% aqueous solution was 96.8%. The diacetone unit content of DA-PVA3 was 6.1 mol %.

Example 4

In the same manner as in Example 3 except that the saponification conditions were changed, the DA-PVA resin (DA-PVA4) shown in Table 1 was obtained. Regarding the obtained DA-PVA4, the viscosity of a 4% aqueous solution was 20.1 mPa·s, the saponification degree was 96.0 mol %, and the transparency of the 4% aqueous solution was 93.8%. The diacetone unit content of DA-PVA4 was 6.1 mol %.

Example 5

Into a flask equipped with a stirrer, a thermometer, a dropping funnel, and a reflux condenser, 2400 parts of vinyl acetate, 403 parts of methanol, and 12.8 parts of diacetone acrylamide were placed. After nitrogen replacement of the system, the internal temperature was raised to 60° C. After that, a solution of 0.8 part of 2,2-azobisisobutyronitrile in 100 parts of methanol was added to the system to start polymerization. While nitrogen circulation was continued, a solution of 138.2 parts of diacetone acrylamide in 95 parts of methanol was added dropwise at a constant rate from immediately after the start of the polymerization. At the end of the polymerization, m-dinitrobenzene as a polymerization inhibitor was added to stop the polymerization. The polymerization yield at the end of the later addition of diacetone acrylamide was 50.3%, and the yield at the end of the polymerization was 54.0%. The ratio (a)/(b) of the polymerization yield at the end of the polymerization (a) to the polymerization yield at the end of the later addition (b) was 1.07. The weight ratio of the diacetone acrylamide remaining after the polymerization calculated by the formula (e)/((e)+(f)) (where (e) is the amount of the remaining diacetone acrylamide at the end of the polymerization and (f) is the amount of the remaining aliphatic vinyl ester at the end of the polymerization) was less than 0.1%. The weight ratio (c)/(d) of the amount of diacetone acrylamide added at an earlier stage (c) to the amount of diacetone acrylamide added at a later stage (d) was 8.5/91.5. The obtained reaction mixture was subjected to removal of the remaining vinyl acetate by distillation by continuous addition of methanol vapor, and thus a 43% solution of a diacetone acrylamide-vinyl acetate copolymer in methanol was obtained. To 500 parts of this solution, 70 parts of methanol, 2 parts of ion-exchange water, and 14 parts of a 4% solution of sodium hydroxide in methanol were added and thoroughly mixed, and saponification was allowed to proceed at 45° C. The obtained gelatinous material was pulverized, thoroughly washed with methanol, and dried to give a DA-PVA resin (DA-PVA5). Regarding the obtained DA-PVA5, the viscosity of a 4% aqueous solution was 41.5 mPa·s, the saponification degree was 98.1 mol %, and the transparency of the 4% aqueous solution was 97.4%. The diacetone unit content of DA-PVA5 was 5.7 mol %.

Example 6

Into a flask equipped with a stirrer, a thermometer, a dropping funnel, and a reflux condenser, 2000 parts of vinyl acetate, 127 parts of methanol, and 12.1 parts of diacetone acrylamide were placed. After nitrogen replacement of the system, the internal temperature was raised to 60° C. After that, a solution of 0.7 part of 2,2-azobisisobutyronitrile in 100 parts of methanol was added to the system to start polymerization. While nitrogen circulation was continued, a solution of 110.9 parts of diacetone acrylamide in 90 parts of methanol was added dropwise at a constant rate from immediately after the start of the polymerization. At the end of the polymerization, m-dinitrobenzene as a polymerization inhibitor was added to stop the polymerization. The polymerization yield at the end of the later addition of diacetone acrylamide was 43.9%, and the yield at the end of the polymerization was 48.0%. The ratio (a)/(b) of the polymerization yield at the end of the polymerization (a) to the polymerization yield at the end of the later addition (b) was 1.09. The weight ratio of the diacetone acrylamide remaining after the polymerization calculated by the formula (e)/((e)+(f)) (where (e) is the amount of the remaining diacetone acrylamide at the end of the polymerization and (f) is the amount of the remaining aliphatic vinyl ester at the end of the polymerization) was less than 0.1%. The weight ratio (c)/(d) of the amount of diacetone acrylamide added at an earlier stage (c) to the amount of diacetone acrylamide added at a later stage (d) was 9.8/90.2. The obtained reaction mixture was subjected to removal of the remaining vinyl acetate by distillation by continuous addition of methanol vapor, and thus a 39% solution of a diacetone acrylamide-vinyl acetate copolymer in methanol was obtained. To 500 parts of this solution, 70 parts of methanol, 2 parts of ion-exchange water, and 14 parts of a 4% solution of sodium hydroxide in methanol were added and thoroughly mixed, and saponification was allowed to proceed at 45° C. The obtained gelatinous material was pulverized, thoroughly washed with methanol, and dried to give a DA-PVA resin (DA-PVA6). Regarding the obtained DA-PVA6, the viscosity of a 4% aqueous solution was 61.2 mPa·s, the saponification degree was 98.3 mol %, and the transparency of the 4% aqueous solution was 95.4%. The diacetone unit content of DA-PVA6 was 6.4 mol %.

Example 7

Into a flask equipped with a stirrer, a thermometer, a dropping funnel, and a reflux condenser, 2400 parts of vinyl acetate and 13.8 parts of diacetone acrylamide were placed. After nitrogen replacement of the system, the internal temperature was raised to 60° C. After that, a solution of 0.3 part of 2,2-azobisisobutyronitrile in 32 parts of methanol was added to the system to start polymerization. While nitrogen circulation was continued, a solution of 101.2 parts of diacetone acrylamide in 45 parts of methanol was added dropwise at a constant rate from immediately after the start of the polymerization. At the end of the polymerization, m-dinitrobenzene as a polymerization inhibitor was added to stop the polymerization. The polymerization yield at the end of the later addition of diacetone acrylamide was 35.1%, and the yield at the end of the polymerization was 37.2%. The ratio (a)/(b) of the polymerization yield at the end of the polymerization (a) to the polymerization yield at the end of the later addition (b) was 1.06. The weight ratio of the diacetone acrylamide remaining after the polymerization calculated by the formula (e)/((e)+(f)) (where (e) is the amount of the remaining diacetone acrylamide at the end of the polymerization and (f) is the amount of the remaining aliphatic vinyl ester at the end of the polymerization) was 0.23%. The weight ratio (c)/(d) of the amount of diacetone acrylamide added at an earlier stage (c) to the amount of diacetone acrylamide added at a later stage (d) was 12.0/88.0. The obtained reaction mixture was subjected to removal of the remaining vinyl acetate by distillation by continuous addition of methanol vapor, and thus a 37% solution of a diacetone acrylamide-vinyl acetate copolymer in methanol was obtained. To 500 parts of this solution, 70 parts of methanol, 2 parts of ion-exchange water, and 14 parts of a 4% solution of sodium hydroxide in methanol were added and thoroughly mixed, and saponification was allowed to proceed at 45° C. The obtained gelatinous material was pulverized, thoroughly washed with methanol, and dried to give a DA-PVA resin (DA-PVA7). Regarding the obtained DA-PVA7, the viscosity of a 4% aqueous solution was 131.2 mPa·s, the saponification degree was 98.3 mol %, and the transparency of the 4% aqueous solution was 94.4%. The diacetone unit content of DA-PVA7 was 6.5 mol %.

Example 8

Into a flask equipped with a stirrer, a thermometer, a dropping funnel, and a reflux condenser, 2500 parts of vinyl acetate, 663 parts of methanol, and 3.6 parts of diacetone acrylamide were placed. After nitrogen replacement of the system, the internal temperature was raised to 60° C. After that, a solution of 1.4 parts of 2,2-azobisisobutyronitrile in 100 parts of methanol was added to the system to start polymerization. While nitrogen circulation was continued, a solution of 85.9 parts of diacetone acrylamide in 55 parts of methanol was added dropwise at a constant rate from immediately after the start of the polymerization. At the end of the polymerization, m-dinitrobenzene as a polymerization inhibitor was added to stop the polymerization. The polymerization yield at the end of the later addition of diacetone acrylamide was 69.0%, and the yield at the end of the polymerization was 70.5%. The ratio (a)/(b) of the polymerization yield at the end of the polymerization (a) to the polymerization yield at the end of the later addition (b) was 1.02. The weight ratio of the diacetone acrylamide remaining after the polymerization calculated by the formula (e)/((e)+(f)) (where (e) is the amount of the remaining diacetone acrylamide at the end of the polymerization and (f) is the amount of the remaining aliphatic vinyl ester at the end of the polymerization) was less than 0.1%. The weight ratio (c)/(d) of the amount of diacetone acrylamide added at an earlier stage (c) to the amount of diacetone acrylamide added at a later stage (d) was 4.0/96.0. The obtained reaction mixture was subjected to removal of the remaining vinyl acetate by distillation by continuous addition of methanol vapor, and thus a 50% solution of a diacetone acrylamide-vinyl acetate copolymer in methanol was obtained. To 500 parts of this solution, 70 parts of methanol, 2 parts of ion-exchange water, and 15 parts of a 4% solution of sodium hydroxide in methanol were added and thoroughly mixed, and saponification was allowed to proceed at 45° C. The obtained gelatinous material was pulverized, thoroughly washed with methanol, and dried to give a DA-PVA resin (DA-PVA8). Regarding the obtained DA-PVA8, the viscosity of a 4% aqueous solution was 22.5 mPa·s, the saponification degree was 98.5 mol %, and the transparency of the 4% aqueous solution was 97.1%. The diacetone unit content of DA-PVA8 was 2.6 mol %.

Example 9

In the same manner as in Example 8 except that the saponification conditions were changed, the DA-PVA resin (DA-PVA9) shown in Table 1 was obtained. Regarding the obtained DA-PVA9, the viscosity of a 4% aqueous solution was 20.8 mPa·s, the saponification degree was 88.1 mol %, and the transparency of the 4% aqueous solution was 93.0%. The diacetone unit content of DA-PVA9 was 2.6 mol %.

Example 10

Into a flask equipped with a stirrer, a thermometer, a dropping funnel, and a reflux condenser, 2500 parts of vinyl acetate, 652 parts of methanol, and 1 part of diacetone acrylamide were placed. After nitrogen replacement of the system, the internal temperature was raised to 60° C. After that, a solution of 1.4 parts of 2,2-azobisisobutyronitrile in 100 parts of methanol was added to the system to start polymerization. While nitrogen circulation was continued, a solution of 52 parts of diacetone acrylamide in 55 parts of methanol was added dropwise at a constant rate from immediately after the start of the polymerization. At the end of the polymerization, m-dinitrobenzene as a polymerization inhibitor was added to stop the polymerization. The polymerization yield at the end of the later addition of diacetone acrylamide was 68.1%, and the yield at the end of the polymerization was 68.5%. The ratio (a)/(b) of the polymerization yield at the end of the polymerization (a) to the polymerization yield at the end of the later addition (b) was 1.01. The weight ratio of the diacetone acrylamide remaining after the polymerization calculated by the formula (e)/((e)+(f)) (where (e) is the amount of the remaining diacetone acrylamide at the end of the polymerization and (f) is the amount of the remaining aliphatic vinyl ester at the end of the polymerization) was less than 0.1%. The weight ratio (c)/(d) of the amount of diacetone acrylamide added at an earlier stage (c) to the amount of diacetone acrylamide added at a later stage (d) was 2.0/98.0. The obtained reaction mixture was subjected to removal of the remaining vinyl acetate by distillation by continuous addition of methanol vapor, and thus a 50% solution of a diacetone acrylamide-vinyl acetate copolymer in methanol was obtained. To 500 parts of this solution, 70 parts of methanol, 2 parts of ion-exchange water, and 15 parts of a 4% solution of sodium hydroxide in methanol were added and thoroughly mixed, and saponification was allowed to proceed at 40° C. The obtained gelatinous material was pulverized, thoroughly washed with methanol, and dried to give a DA-PVA resin (DA-PVA10). Regarding the obtained DA-PVA10, the viscosity of a 4% aqueous solution was 24.1 mPa·s, the saponification degree was 98.6 mol %, and the transparency of the 4% aqueous solution was 96.9%. The diacetone unit content of DA-PVA10 was 1.5 mol %.

Example 11

In the same manner as in Example 10 except that the saponification conditions were changed, the DA-PVA resin (DA-PVA11) shown in Table 1 was obtained. Regarding the obtained DA-PVA11, the viscosity of a 4% aqueous solution was 21.2 mPa·s, the saponification degree was 84.1 mol %, and the transparency of the 4% aqueous solution was 91.5%. The diacetone unit content of DA-PVA11 was 1.5 mol %.

Example 12

Into a flask equipped with a stirrer, a thermometer, a dropping funnel, and a reflux condenser, 205 parts of vinyl acetate, 308 parts of methanol, and 1 part of diacetone acrylamide were placed. After nitrogen replacement of the system, the internal temperature was raised to 60° C. After that, a solution of 10 parts of 2,2-azobisisobutyronitrile in 1000 parts of methanol was added to the system to start polymerization. While nitrogen circulation was continued, a solution of 129 parts of diacetone acrylamide in 79 parts of methanol and 1473 parts of vinyl acetate were added dropwise at a constant rate from immediately after the start of the polymerization. At the end of the polymerization, m-dinitrobenzene as a polymerization inhibitor was added to stop the polymerization. The vinyl acetate was added until the polymerization yield reached 63.0%. The polymerization yield at the end of the later addition of diacetone acrylamide was 79.1%, and the yield at the end of the polymerization was 80.5%. The ratio (a)/(b) of the polymerization yield at the end of the polymerization (a) to the polymerization yield at the end of the later addition (b) was 1.02. The weight ratio of the diacetone acrylamide remaining after the polymerization calculated by the formula (e)/((e)+(f)) (where (e) is the amount of the remaining diacetone acrylamide at the end of the polymerization and (f) is the amount of the remaining aliphatic vinyl ester at the end of the polymerization) was less than 0.1%. The weight ratio (c)/(d) of the amount of diacetone acrylamide added at an earlier stage (c) to the amount of diacetone acrylamide added at a later stage (d) was 1.0/99.0. The obtained reaction mixture was subjected to removal of the remaining vinyl acetate by distillation by continuous addition of methanol vapor, and thus a 61% solution of a diacetone acrylamide-vinyl acetate copolymer in methanol was obtained. To 500 parts of this solution, 50 parts of methanol, 2 parts of ion-exchange water, and 16 parts of a 4% solution of sodium hydroxide in methanol were added and thoroughly mixed, and saponification was allowed to proceed at 40° C. The obtained gelatinous material was pulverized, thoroughly washed with methanol, and dried to give a DA-PVA resin (DA-PVA12). Regarding the obtained DA-PVA12, the viscosity of a 4% aqueous solution was 3.4 mPa·s, the saponification degree was 98.6 mol %, and the transparency of the 4% aqueous solution was 90.1%. The diacetone unit content of DA-PVA12 was 4.3 mol %.

Example 13

Into a flask equipped with a stirrer, a thermometer, a dropping funnel, and a reflux condenser, 500 parts of vinyl acetate, 155 parts of methanol, and 5 parts of diacetone acrylamide were placed. After nitrogen replacement of the system, the internal temperature was raised to 60° C. After that, a solution of 9 parts of 2,2-azobisisobutyronitrile in 900 parts of methanol was added to the system to start polymerization. While nitrogen circulation was continued, a solution of 349 parts of diacetone acrylamide in 227 parts of methanol and 1500 parts of vinyl acetate were added dropwise at a constant rate from immediately after the start of the polymerization. At the end of the polymerization, m-dinitrobenzene as a polymerization inhibitor was added to stop the polymerization. The vinyl acetate was added until the polymerization yield reached 74.0%. The polymerization yield at the end of the later addition of diacetone acrylamide was 81.2%, and the yield at the end of the polymerization was 84.7%. The ratio (a)/(b) of the polymerization yield at the end of the polymerization (a) to the polymerization yield at the end of the later addition (b) was 1.04. The weight ratio of the diacetone acrylamide remaining after the polymerization calculated by the formula (e)/((e)+(f)) (where (e) is the amount of the remaining diacetone acrylamide at the end of the polymerization and (f) is the amount of the remaining aliphatic vinyl ester at the end of the polymerization) was 0.48%. The weight ratio (c)/(d) of the amount of diacetone acrylamide added at an earlier stage (c) to the amount of diacetone acrylamide added at a later stage (d) was 1.4/98.6. The obtained reaction mixture was subjected to removal of the remaining vinyl acetate by distillation by continuous addition of methanol vapor, and thus a 58% solution of a diacetone acrylamide-vinyl acetate copolymer in methanol was obtained. To 500 parts of this solution, 50 parts of methanol, 2 parts of ion-exchange water, and 16 parts of a 4% solution of sodium hydroxide in methanol were added and thoroughly mixed, and saponification was allowed to proceed at 40° C. The obtained gelatinous material was pulverized, thoroughly washed with methanol, and dried to give a DA-PVA resin (DA-PVA13). Regarding the obtained DA-PVA13, the viscosity of a 4% aqueous solution was 5.1 mPa·s, the saponification degree was 96.0 mol %, and the transparency of the 4% aqueous solution was 90.3%. The diacetone unit content of DA-PVA13 was 10.6 mol %.

Example 14

Into a flask equipped with a stirrer, a thermometer, a dropping funnel, and a reflux condenser, 2000 parts of vinyl acetate and 604 parts of methanol were placed. After nitrogen replacement of the system, the internal temperature was raised to 60° C. After that, a solution of 1.2 parts of 2,2-azobisisobutyronitrile in 100 parts of methanol was added to the system to start polymerization. While nitrogen circulation was continued, a solution of 136 parts of diacetone acrylamide in 80 parts of methanol was added dropwise at a constant rate from immediately after the start of the polymerization. At the end of the polymerization, m-dinitrobenzene as a polymerization inhibitor was added to stop the polymerization. The polymerization yield at the end of the later addition of diacetone acrylamide was 70.6%, and the yield at the end of the polymerization was 74.7%. The ratio (a)/(b) of the polymerization yield at the end of the polymerization (a) to the polymerization yield at the end of the later addition (b) was 1.06. The weight ratio of the diacetone acrylamide remaining after the polymerization calculated by the formula (e)/((e)+(f)) (where (e) is the amount of the remaining diacetone acrylamide at the end of the polymerization and (f) is the amount of the remaining aliphatic vinyl ester at the end of the polymerization) was less than 0.1%. The weight ratio (c)/(d) of the amount of diacetone acrylamide added at an earlier stage (c) to the amount of diacetone acrylamide added at a later stage (d) was 0/100. The obtained reaction mixture was subjected to removal of the remaining vinyl acetate by distillation by continuous addition of methanol vapor, and thus a 50% solution of a diacetone acrylamide-vinyl acetate copolymer in methanol was obtained. To 500 parts of this solution, 70 parts of methanol, 2 parts of ion-exchange water, and 15 parts of a 4% solution of sodium hydroxide in methanol were added and thoroughly mixed, and saponification was allowed to proceed at 45° C. The obtained gelatinous material was pulverized, thoroughly washed with methanol, and dried to give a DA-PVA resin (DA-PVA14). Regarding the obtained DA-PVA14, the viscosity of a 4% aqueous solution was 21.3 mPa·s, the saponification degree was 98.5 mol %, and the transparency of the 4% aqueous solution was 97.1%. The diacetone unit content of DA-PVA14 was 4.5 mol %.

TABLE 1

| | DA-PVA resin | (a)/(b) | (c)/(d) | Weight ratio of remaining diacetone acrylamide (e)/((e) + (f)) | Viscosity of 4% aqueous solution (mPa · s) | Saponification degree (mol %) | Transparency of 4% aqueous solution (%) | Diacetone acrylamide unit content (mol %) |
|---|---|---|---|---|---|---|---|---|
| Ex. 1 | DA-PVA1 | 1.05 | 6.0/94.0 | less than 0.1% | 20.5 | 98.6 | 97.8 | 4.6 |
| Ex. 2 | DA-PVA2 | 1.05 | 6.0/94.0 | less than 0.1% | 19.8 | 92.4 | 96.8 | 4.6 |
| Ex. 3 | DA-PVA3 | 1.03 | 7.0/93.0 | less than 0.1% | 21.5 | 98.4 | 96.8 | 6.1 |
| Ex. 4 | DA-PVA4 | 1.03 | 7.0/93.0 | less than 0.1% | 20.1 | 96 | 93.8 | 6.1 |
| Ex. 5 | DA-PVA5 | 1.07 | 8.5/91.5 | less than 0.1% | 41.5 | 98.1 | 97.4 | 5.7 |
| Ex. 6 | DA-PVA6 | 1.09 | 9.8/90.2 | less than 0.1% | 61.2 | 98.3 | 95.4 | 6.4 |
| Ex. 7 | DA-PVA7 | 1.06 | 12.0/88.0 | 0.23% | 131.2 | 98.3 | 94.4 | 6.5 |
| Ex. 8 | DA-PVA8 | 1.02 | 4.0/96.0 | less than 0.1% | 22.5 | 98.5 | 97.1 | 2.6 |
| Ex. 9 | DA-PVA9 | 1.02 | 4.0/96.0 | less than 0.1% | 20.8 | 88.1 | 93 | 2.6 |
| Ex. 10 | DA-PVA10 | 1.01 | 2.0/98.0 | less than 0.1% | 24.1 | 98.6 | 96.9 | 1.5 |
| Ex. 11 | DA-PVA11 | 1.01 | 2.0/98.0 | less than 0.1% | 21.2 | 84.1 | 91.5 | 1.5 |
| Ex. 12 | DA-PVA12 | 1.02 | 1.0/99.0 | less than 0.1% | 3.4 | 98.6 | 90.1 | 4.3 |

TABLE 1-continued

| | DA-PVA resin | (a)/(b) | (c)/(d) | Weight ratio of remaining diacetone acrylamide (e)/((e) + (f)) | Viscosity of 4% aqueous solution (mPa · s) | Saponification degree (mol %) | Transparency of 4% aqueous solution (%) | Diacetone acrylamide unit content (mol %) |
|---|---|---|---|---|---|---|---|---|
| Ex. 13 | DA-PVA13 | 1.04 | 1.4/98.6 | 0.48% | 5.1 | 96 | 90.3 | 10.6 |
| Ex. 14 | DA-PVA14 | 1.06 | 0/100 | less than 0.1% | 21.3 | 98.5 | 97.1 | 4.5 |

Ex.: Example
(a)/(b): the ratio of the polymerization yield at the end of the polymerization (a) to the polymerization yield at the end of the later addition (b)
(c)/(d): the weight ratio of the amount of diacetone acrylamide added at an earlier stage (c) to the amount of diacetone acrylamide added at a later stage (d)
(e)/((e) + (f)): the weight ratio of diacetone acrylamide remaining after the polymerization (where (e) is the amount of the remaining diacetone acrylamide at the end of the polymerization and (f) is the amount of the remaining aliphatic vinyl ester at the end of the polymerization)

Comparative Example 1

Polymerization was performed in the same manner as in Example 1 except that the polymerization yield at the end of the later addition of diacetone acrylamide was 70.5%, and that the yield at the end of the polymerization was 80.3%. The ratio (a)/(b) of the polymerization yield at the end of the polymerization (a) to the polymerization yield at the end of the later addition (b) was 1.14. The weight ratio of the diacetone acrylamide remaining after the polymerization calculated by the formula (e)/((e)+(f)) (where (e) is the amount of the remaining diacetone acrylamide at the end of the polymerization and (f) is the amount of the remaining aliphatic vinyl ester at the end of the polymerization) was less than 0.1%. The weight ratio (c)/(d) of the amount of diacetone acrylamide added at an earlier stage (c) to the amount of diacetone acrylamide added at a later stage (d) was 6.0/94.0. The obtained reaction mixture was subjected to removal of the remaining vinyl acetate by distillation by continuous addition of methanol vapor, and thus a 50% solution of a diacetone acrylamide-vinyl acetate copolymer in methanol was obtained. To 500 parts of this solution, 70 parts of methanol, 2 parts of ion-exchange water, and 15 parts of a 4% solution of sodium hydroxide in methanol were added and thoroughly mixed, and saponification was allowed to proceed at 45° C. The obtained gelatinous material was pulverized, thoroughly washed with methanol, and dried to give a DA-PVA resin (DA-PVA15). Regarding the obtained DA-PVA15, the viscosity of a 4% aqueous solution was 18.5 mPa·s, the saponification degree was 98.4 mol %, and the transparency of the 4% aqueous solution was 82.3%. The diacetone unit content of DA-PVA15 was 4.2 mol %.

Comparative Example 2

In the same manner as in Comparative Example 1 except that the saponification conditions were changed, the DA-PVA resin (DA-PVA16) shown in Table 2 was obtained. Regarding the obtained DA-PVA16, the viscosity of a 4% aqueous solution was 18.0 mPa·s, the saponification degree was 93.3 mol %, and the transparency of the 4% aqueous solution was 81.4%. The diacetone unit content of DA-PVA16 was 4.2 mol %.

Comparative Example 3

Polymerization was performed in the same manner as in Example 2 except that the polymerization yield at the end of the later addition of diacetone acrylamide was 68.5%, and that the yield at the end of the polymerization was 82.6%. The ratio (a)/(b) of the polymerization yield at the end of the polymerization (a) to the polymerization yield at the end of the later addition (b) was 1.21. The weight ratio of the diacetone acrylamide remaining after the polymerization calculated by the formula (e)/((e)+(f)) (where (e) is the amount of the remaining diacetone acrylamide at the end of the polymerization and (f) is the amount of the remaining aliphatic vinyl ester at the end of the polymerization) was less than 0.1%. The weight ratio (c)/(d) of the amount of diacetone acrylamide added at an earlier stage (c) to the amount of diacetone acrylamide added at a later stage (d) was 7.0/93.0. The obtained reaction mixture was subjected to removal of the remaining vinyl acetate by distillation by continuous addition of methanol vapor, and thus a 48% solution of a diacetone acrylamide-vinyl acetate copolymer in methanol was obtained. To 500 parts of this solution, 70 parts of methanol, 2 parts of ion-exchange water, and 14 parts of a 4% solution of sodium hydroxide in methanol were added and thoroughly mixed, and saponification was allowed to proceed at 45° C. The obtained gelatinous material was pulverized, thoroughly washed with methanol, and dried to give a DA-PVA resin (DA-PVA17). Regarding the obtained DA-PVA17, the viscosity of a 4% aqueous solution was 17.8 mPa·s, the saponification degree was 98.2 mol %, and the transparency of the 4% aqueous solution was 73.6%. The diacetone unit content of DA-PVA17 was 5.2 mol %.

Comparative Example 4

In the same manner as in Comparative Example 3 except that the saponification conditions were changed, the DA-PVA resin (DA-PVA18) shown in Table 2 was obtained. Regarding the obtained DA-PVA18, the viscosity of a 4% aqueous solution was 17.0 mPa·s, the saponification degree was 96.5 mol %, and the transparency of the 4% aqueous solution was 71.4%. The diacetone unit content of DA-PVA18 was 5.2 mol %.

Comparative Example 5

Polymerization was performed in the same manner as in Example 6 except that the polymerization yield at the end of the later addition of diacetone acrylamide and the yield at the end of the polymerization were 44.1%. The ratio (a)/(b) of the polymerization yield at the end of the polymerization (a) to the polymerization yield at the end of the later addition (b) was 1.00. The weight ratio of the diacetone acrylamide remaining after the polymerization calculated by the formula (e)/((e)+(f)) (where (e) is the amount of the remaining diacetone acrylamide at the end of the polymerization and (f) is the amount of the remaining aliphatic vinyl ester at the end of the polymerization) was 0.57%. The weight ratio (c)/(d) of the amount of diacetone acrylamide added at an earlier stage (c) to the amount of diacetone acrylamide added at a later stage (d) was 9.8/90.2. The remaining diacetone acrylamide in the polymer exceeded 0.5%, which was not industrially preferable. For the reason, saponification to prepare a DA-PVA resin was not performed.

Comparative Example 6

Into a flask equipped with a stirrer, a thermometer, a dropping funnel, and a reflux condenser, 2000 parts of vinyl acetate, 604 parts of methanol, and 27.2 parts of diacetone acrylamide were placed. After nitrogen replacement of the system, the internal temperature was raised to 60° C. After that, a solution of 1.2 parts of 2,2-azobisisobutyronitrile in 100 parts of methanol was added to the system to start polymerization. While nitrogen circulation was continued, a solution of 108.8 parts of diacetone acrylamide in 80 parts of methanol was added dropwise at a constant rate from immediately after the start of the polymerization. At the end of the polymerization, m-dinitrobenzene as a polymerization inhibitor was added to stop the polymerization. The polymerization yield at the end of the later addition of diacetone acrylamide was 64.8%, and the yield at the end of the polymerization was 73.8%. The ratio (a)/(b) of the polymerization yield at the end of the polymerization (a) to the polymerization yield at the end of the later addition (b) was 1.14. The weight ratio of the diacetone acrylamide remaining after the polymerization calculated by the formula (e)/((e)+(f)) (where (e) is the amount of the remaining diacetone acrylamide at the end of the polymerization and (f) is the amount of the remaining aliphatic vinyl ester at the end of the polymerization) was less than 0.1%. The weight ratio (c)/(d) of the amount of diacetone acrylamide added at an earlier stage (c) to the amount of diacetone acrylamide added at a later stage (d) was 20.0/80.0. The obtained reaction mixture was subjected to removal of the remaining vinyl acetate by distillation by continuous addition of methanol vapor, and thus a 50% solution of a diacetone acrylamide-vinyl acetate copolymer in methanol was obtained. To 500 parts of this solution, 70 parts of methanol, 2 parts of ion-exchange water, and 15 parts of a 4% solution of sodium hydroxide in methanol were added and thoroughly mixed, and saponification was allowed to proceed at 45° C. The obtained gelatinous material was pulverized, thoroughly washed with methanol, and dried to give a DA-PVA resin (DA-PVA19). Regarding the obtained DA-PVA19, the viscosity of a 4% aqueous solution was 21.2 mPa·s, the saponification degree was 98.1 mol %, and the transparency of the 4% aqueous solution was 75.1%. The diacetone unit content of DA-PVA19 was 4.6 mol %.

Comparative Example 7

In the same manner as in Comparative Example 6 except that the saponification conditions were changed, the DA-PVA resin (DA-PVA20) shown in Table 2 was obtained. Regarding the obtained DA-PVA20, the viscosity of a 4% aqueous solution was 20.6 mPa·s, the saponification degree was 91.8 mol %, and the transparency of the 4% aqueous solution was 72.3%. The diacetone unit content of DA-PVA20 was 4.6 mol %.

Comparative Example 8

Into a flask equipped with a stirrer, a thermometer, a dropping funnel, and a reflux condenser, 2400 parts of vinyl acetate and 57.5 parts of diacetone acrylamide were placed. After nitrogen replacement of the system, the internal temperature was raised to 60° C. After that, a solution of 0.3 part of 2,2-azobisisobutyronitrile in 32 parts of methanol was added to the system to start polymerization. While nitrogen circulation was continued, a solution of 57.5 parts of diacetone acrylamide in 33 parts of methanol was added dropwise at a constant rate from immediately after the start of the polymerization. At the end of the polymerization, m-dinitrobenzene as a polymerization inhibitor was added to stop the polymerization. The polymerization yield at the end of the later addition of diacetone acrylamide was 35.1%, and the yield at the end of the polymerization was 39.2%. The ratio (a)/(b) of the polymerization yield at the end of the polymerization (a) to the polymerization yield at the end of the later addition (b) was 1.12. The weight ratio of the diacetone acrylamide remaining after the polymerization calculated by the formula (e)/((e)+(f)) (where (e) is the amount of the remaining diacetone acrylamide at the end of the polymerization and (f) is the amount of the remaining aliphatic vinyl ester at the end of the polymerization) was less than 0.1%. The weight ratio (c)/(d) of the amount of diacetone acrylamide added at an earlier stage (c) to the amount of diacetone acrylamide added at a later stage (d) was 50.0/50.0. The obtained reaction mixture was subjected to removal of the remaining vinyl acetate by distillation by continuous addition of methanol vapor, and thus a 37% solution of a diacetone acrylamide-vinyl acetate copolymer in methanol was obtained. To 500 parts of this solution, 70 parts of methanol, 2 parts of ion-exchange water, and 14 parts of a 4% solution of sodium hydroxide in methanol were added and thoroughly mixed, and saponification was allowed to proceed at 45° C. The obtained gelatinous material was pulverized, thoroughly washed with methanol, and dried to give a DA-PVA resin (DA-PVA21). Regarding the obtained DA-PVA21, the viscosity of a 4% aqueous solution was 134.8 mPa·s, the saponification degree was 98.1 mol %, and the transparency of the 4% aqueous solution was 46.4%. The diacetone unit content of DA-PVA21 was 6.2 mol %.

TABLE 2

| | DA-PVA resin | (a)/(b) | (c)/(d) | Weight ratio of remaining diacetone acrylamide (e)/((e) + (f)) | Viscosity of 4% aqueous solution (mPa · s) | Saponification degree (mol %) | Transparency of 4% aqueous solution (%) | Diacetone acrylamide unit content (mol %) |
|---|---|---|---|---|---|---|---|---|
| Comp. Ex. 1 | DA-PVA15 | 1.14 | 6.0/94.0 | less than 0.1% | 18.5 | 98.4 | 82.3 | 4.2 |
| Comp. Ex. 2 | DA-PVA16 | 1.14 | 6.0/94.0 | less than 0.1% | 18 | 93.3 | 81.4 | 4.2 |
| Comp. Ex. 3 | DA-PVA17 | 1.21 | 7.0/93.0 | less than 0.1% | 17.8 | 98.2 | 73.6 | 5.2 |
| Comp. Ex. 4 | DA-PVA18 | 1.21 | 7.0/93.0 | less than 0.1% | 17 | 96.5 | 71.4 | 5.2 |

TABLE 2-continued

| | DA-PVA resin | (a)/(b) | (c)/(d) | Weight ratio of remaining diacetone acrylamide (e)/((e) + (f)) | Viscosity of 4% aqueous solution (mPa · s) | Saponification degree (mol %) | Transparency of 4% aqueous solution (%) | Diacetone acrylamide unit content (mol %) |
|---|---|---|---|---|---|---|---|---|
| Comp. Ex. 5 | — | 1 | 9.8/90.2 | 0.57% | — | — | — | — |
| Comp. Ex. 6 | DA-PVA19 | 1.14 | 20.0/80.0 | less than 0.1% | 21.2 | 98.1 | 75.1 | 4.6 |
| Comp. Ex. 7 | DA-PVA20 | 1.14 | 20.0/80.0 | less than 0.1% | 20.6 | 91.8 | 72.3 | 4.6 |
| Comp. Ex. 8 | DA-PVA21 | 1.12 | 50.0/50.0 | less than 0.1% | 134.8 | 98.1 | 46.4 | 6.2 |

Comp. Ex.: Comparative Example
(a)/(b): the ratio of the polymerization yield at the end of the polymerization (a) to the polymerization yield at the end of the later addition (b)
(c)/(d): the weight ratio of the amount of diacetone acrylamide added at an earlier stage (c) to the amount of diacetone acrylamide added at a later stage (d)
(e)/((e) + (f)): the weight ratio of diacetone acrylamide remaining after the polymerization (where (e) is the amount of the remaining diacetone acrylamide at the end of the polymerization and (f) is the amount of the remaining aliphatic vinyl ester at the end of the polymerization)

As shown in Tables 1 and 2, the DA-PVA resins of the present invention, in which the ratio of the yield at the end of the polymerization to the yield at the end of the later addition of diacetone acrylamide was within the range defined in the present invention, had uniformly introduced diacetone acrylamide units in the structure and resulted in an excellent transparency of a 4 mass % aqueous solution of 90% or higher. In addition, since the ratio of the remaining diacetone acrylamide after copolymerization was low, the production method was also considered to be industrially excellent. Use for thermal recording material Next, the use of the DA-PVA resins obtained in the above Examples and Comparative Examples for thermal recording materials will be described by further Examples and Comparative Examples, but such use for thermal recording materials is not limited to the examples shown below.

(1) Preparation of Thermal Recording Layer-Forming Coating Liquid

Aqueous solutions of the mixtures of the ingredients shown below were separately subjected to pulverization by a sand mill to prepare dispersion liquids A to E.

Dispersion Liquid a (Dye Dispersion Liquid)

20% aqueous solution of PVA having a polymerization degree of 500 and a saponification degree of 88.0 mol %: 10 parts 2-anilino-3-methyl-6-dibutylaminofluorane: 20 parts Pure water: 70 parts Dispersion Liquid B (Developer Dispersion Liquid)

20% aqueous solution of PVA having a polymerization degree of 500 and a saponification degree of 88.0 mol %: 10 parts 4-hydroxy-4'-isopropoxy diphenyl sulfone: 20 parts Pure water: 70 parts Dispersion Liquid C 20% aqueous solution of PVA having a polymerization degree of 500 and a saponification degree of 88.0 mol %: 10 parts Stearamide: 10 parts Kaolin clay: 25 parts Pure water: 55 parts Dispersion Liquid D 20% aqueous solution of a DA-PVA resin (DA-PVA12): 10 parts Stearamide: 10 parts Kaolin clay: 25 parts Pure water: 55 parts Dispersion Liquid E 20% aqueous solution of a DA-PVA resin (DA-PVA13): 10 parts Stearamide: 10 parts Kaolin clay: 25 parts Pure water: 55 parts (2) Preparation of Protection Layer-Forming Coating Liquid The ingredients shown below were mixed at the ratios shown below to prepare protection layer-forming coating liquids A to O.

Protection Layer-Forming Coating Liquid A

10% aqueous solution of a DA-PVA resin (DA-PVA1): 40 parts

20% dispersion of kaolin clay: 8 parts

30% dispersion of zinc stearate: 4 parts

8% aqueous solution of adipic dihydrazide: 5 parts

Water: 43 parts

Protection Layer-Forming Coating Liquid B

10% aqueous solution of a DA-PVA resin (DA-PVA2): 40 parts

20% dispersion of kaolin clay: 8 parts

30% dispersion of zinc stearate: 4 parts

8% aqueous solution of adipic dihydrazide: 5 parts

Water: 43 parts

Protection Layer-Forming Coating Liquid C

10% aqueous solution of a DA-PVA resin (DA-PVA3): 40 parts

20% dispersion of kaolin clay: 8 parts

30% dispersion of zinc stearate: 4 parts

50% aqueous solution of biuretly-tri(hexamethylenesemicarbazide) (made by Asahi Kasei Chemicals Corp., trade name: Hardener SC): 1 part Water: 47 parts Protection Layer-Forming Coating Liquid D 10% aqueous solution of a DA-PVA resin (DA-PVA4): 40 parts 20% dispersion of kaolin clay: 8 parts 30% dispersion of zinc stearate: 4 parts 10% aqueous solution of N-aminopolyacrylamide (made by Otsuka Chemical Co., Ltd., trade name: APA P-280): 4 parts Water: 44 parts Protection Layer-Forming Coating Liquid E 5% aqueous solution of a DA-PVA resin (DA-PVA5): 80 parts 20% dispersion of kaolin clay: 8 parts 30% dispersion of zinc stearate: 4 parts 8% aqueous solution of adipic dihydrazide: 5 parts
Water: 17 parts Protection Layer-Forming Coating Liquid F
5% aqueous solution of a DA-PVA resin (DA-PVA6) 80 parts
20% dispersion of kaolin clay: 8 parts
30% dispersion of zinc stearate: 4 parts
8% aqueous solution of adipic dihydrazide: 5 parts
Water: 17 parts Protection Layer-Forming Coating Liquid G
5% aqueous solution of a DA-PVA resin (DA-PVA7): 80 parts
20% dispersion of kaolin clay: 8 parts
30% dispersion of zinc stearate: 4 parts
8% aqueous solution of adipic dihydrazide: 5 parts
Water: 17 parts Protection Layer-Forming Coating Liquid H
10% aqueous solution of a DA-PVA resin (DA-PVA14): 40 parts
20% dispersion of kaolin clay: 8 parts
30% dispersion of zinc stearate: 4 parts
8% aqueous solution of adipic dihydrazide: 5 parts
Water: 43 parts Protection Layer-Forming Coating Liquid I
10% aqueous solution of a DA-PVA resin (DA-PVA15): 40 parts
20% dispersion of kaolin clay: 8 parts
30% dispersion of zinc stearate: 4 parts
8% aqueous solution of adipic dihydrazide: 5 parts
Water: 57 parts Protection Layer-Forming Coating Liquid J
10% aqueous solution of a DA-PVA resin (DA-PVA16): 40 parts
20% dispersion of kaolin clay: 8 parts
30% dispersion of zinc stearate: 4 parts
8% aqueous solution of adipic dihydrazide: 5 parts
Water: 57 parts Protection Layer-Forming Coating Liquid K
10% aqueous solution of a DA-PVA resin (DA-PVA17): 40 parts
20% dispersion of kaolin clay: 8 parts
30% dispersion of zinc stearate: 4 parts
8% aqueous solution of adipic dihydrazide: 5 parts
Water: 57 parts Protection Layer-Forming Coating Liquid L
10% aqueous solution of a DA-PVA resin (DA-PVA18): 40 parts
20% dispersion of kaolin clay: 8 parts
30% dispersion of zinc stearate: 4 parts
8% aqueous solution of adipic dihydrazide: 5 parts
Water: 57 parts Protection Layer-Forming Coating Liquid M
10% aqueous solution of a DA-PVA resin (DA-PVA19): 40 parts
20% dispersion of kaolin clay: 8 parts
30% dispersion of zinc stearate: 4 parts
8% aqueous solution of adipic dihydrazide: 5 parts
Water: 57 parts Protection Layer-Forming Coating Liquid N
10% aqueous solution of a DA-PVA resin (DA-PVA20): 40 parts
20% dispersion of kaolin clay: 8 parts
30% dispersion of zinc stearate: 4 parts
8% aqueous solution of adipic dihydrazide: 5 parts
Water: 57 parts Protection Layer-Forming Coating Liquid 0
5% aqueous solution of a DA-PVA resin (DA-PVA21): 80 parts
20% dispersion of kaolin clay: 8 parts
30% dispersion of zinc stearate: 4 parts
8% aqueous solution of adipic dihydrazide: 5 parts
Water: 17 parts (3) Preparation of Thermal Recording Paper

Example 15

To prepare a thermal recording layer-forming coating liquid, 100 parts of dispersion liquid A, 100 parts of dispersion liquid B, and 280 parts of dispersion liquid C were mixed. The coating liquid was applied onto a high-quality paper having a grammage of 64 g/m$^2$ so that the amount of the dye contained in the dye dispersion liquid applied onto the paper would be 0.5 g/m$^2$, and was dried. Onto this, the protection layer-forming coating liquid A was applied so that the amount thereof after drying would be 3 g/m$^2$, and was dried. Subsequently, calendering was performed to give a thermal recording material.

Examples 16 to 22

To produce a thermal recording material, the same procedure as in Example 15 was performed except that, instead of the protection layer-forming coating liquid A, the protection layer-forming coating liquid shown in Table 3 was used.

Examples 23 to 27

To produce a thermal recording material, the same procedure as in Example 15 was performed except that, instead of dispersion liquid C and the protection layer-forming coating liquid A, those shown in Table 3 were used.

Comparative Examples 9 to 15

To produce a thermal recording material, the same procedure as in Example 15 was performed except that, instead of the protection layer-forming coating liquid A, the protection layer-forming coating liquid shown in Table 3 was used.

The physical properties of the obtained thermal recording materials were evaluated as follows, and the results are shown in Table 3.

Evaluation of Water Resistance 1

Each thermal recording material was immersed in water at 20° C. for 24 hours and then taken out therefrom. After the coated surface was rubbed with a finger 10 times, the condition was evaluated.

Excellent: No peeling was observed.

Good: No peeling was observed but the surface was slightly sticky.

Poor: Dissolution of the protection layer was observed.

Evaluation of water resistance 2

On each thermal recording paper, characters were printed using a thermal recording paper testing system TH-PMG (made by Okura Engineering Co., Ltd.) at applied energy of 0.4 mJ/dot. After the test pieces were immersed in water at 20° C. for 24 hours, the optical density of the printed characters was determined using a Macbeth densitometer RD19I (made by Sakata Inx Eng. Co., Ltd.).

Color Appearance

On each thermal recording paper, characters were printed using a thermal recording paper testing system TH-PMG (made by Okura Engineering Co., Ltd.) at applied energy of 0.4 mJ/dot, and the optical density of the printed characters was determined using a Macbeth densitometer RD19I (made by Sakata Inx Eng. Co., Ltd.).

TABLE 3

| | Thermal recording layer-forming coating liquid (containing dispersion liquid) | | | Protection layer-forming coating liquid | Evaluation of physical properties | | |
|---|---|---|---|---|---|---|---|
| | | | | | Water resistance 1 | Water resistance 2 | Color appearance |
| Ex. 15 | A | B | C | A | Excellent | 1.33 | 1.38 |
| Ex. 16 | A | B | C | B | Excellent | 1.33 | 1.38 |
| Ex. 17 | A | B | C | C | Excellent | 1.34 | 1.38 |
| Ex. 18 | A | B | C | D | Excellent | 1.34 | 1.37 |
| Ex. 19 | A | B | C | E | Excellent | 1.33 | 1.37 |
| Ex. 20 | A | B | C | F | Excellent | 1.34 | 1.38 |
| Ex. 21 | A | B | C | G | Excellent | 1.33 | 1.37 |
| Ex. 22 | A | B | C | H | Excellent | 1.33 | 1.38 |
| Ex. 23 | A | B | D | A | Excellent | 1.34 | 1.36 |
| Ex. 24 | A | B | D | F | Excellent | 1.35 | 1.37 |
| Ex. 25 | A | B | E | A | Excellent | 1.34 | 1.36 |
| Ex. 26 | A | B | E | C | Excellent | 1.34 | 1.36 |
| Ex. 27 | A | B | D | H | Good | 1.25 | 1.33 |
| Comp. Ex. 9 | A | B | C | I | Poor | 1.19 | 1.34 |
| Comp. Ex. 10 | A | B | C | J | Poor | 1.2 | 1.34 |
| Comp. Ex. 11 | A | B | C | K | Poor | 1.18 | 1.32 |
| Comp. Ex. 12 | A | B | C | L | Poor | 1.19 | 1.32 |
| Comp. Ex. 13 | A | B | C | M | Poor | 1.2 | 1.33 |
| Comp. Ex. 14 | A | B | C | N | Poor | 1.21 | 1.33 |
| Comp. Ex. 15 | A | B | C | O | Poor | 1.21 | 1.33 |

Ex.: Example
Comp. Ex.: Comparative Example

The results in Table 3 show that thermal recording materials of Examples 15 to 27, in which uniform introduction of diacetone acrylamide was achieved as a result of using the DA-PVA resins of the present invention, were superior to those of Comparative Examples 9 to 15 in terms of water resistance and color appearance.

Use for Inkjet Recording Materials

Next, the use of the DA-PVA resins obtained in the above Examples and Comparative Examples for inkjet recording materials will be described by further Examples and Comparative Examples, but such use for inkjet recording materials is not limited to the examples shown below.

Example 28

To 100 parts of an 8% aqueous solution of a DA-PVA resin (DA-PVA1), 7 parts of an 8% aqueous solution of adipic dihydrazide was added and mixed. To 50 parts of the obtained mixture, 35 parts of amorphous silica (made by Tokuyama, trade name: FINESIL X-45, mean particle size 4.5 μm) was gradually added and dispersed. To this, 5 parts of polydiallyldimethylammonium chloride (made by Nittobo, trade name: PAS-H-5L, 28% aqueous solution) as an ink fixing agent and 160 parts of pure water were added, and the mixture was stirred using a homogenizer at 5000 rpm for 10 minutes to prepare an ink accepting layer-forming coating liquid having a solid content of 15%. The coating liquid was applied to a high-quality paper having a grammage of 64 g/m$^2$ with the use of an air knife coater so that the amount of the solid content would be 13 g/m$^2$, and the paper was dried at 105° C. for 10 minutes to prepare an inkjet recording material.

Example 29

An inkjet recording material was produced in the same manner as in Example 28 except that, instead of adipic dihydrazide, biuretly-tri(hexamethylenesemicarbazide) (made by Asahi Kasai Chemicals Corp., trade name: Hardener SC, 50% aqueous solution) was used.

Example 30

An inkjet recording material was produced in the same manner as in Example 28 except that the DA-PVA resin was changed from DA-PVA1 to DA-PVA3 and that, instead of adipic dihydrazide, N-aminopolyacrylamide (made by Otsuka Chemical Co., Ltd., trade name: APA P-280) was used

Example 31

An inkjet recording material was produced in the same manner as in Example 28 except that the DA-PVA resin was changed from DA-PVA1 to DA-PVA5.

Example 32

An inkjet recording material was produced in the same manner as in Example 28 except that the DA-PVA resin was changed from DA-PVA1 to DA-PVA6.

Example 33

An inkjet recording material was produced in the same manner as in Example 28 except that the DA-PVA resin was changed from DA-PVA1 to DA-PVA7.

Comparative Example 16

An inkjet recording material was produced in the same manner as in Example 28 except that the DA-PVA resin was changed from DA-PVA1 to DA-PVA15.

Comparative Example 17

An inkjet recording material was produced in the same manner as in Example 28 except that the DA-PVA resin was changed from DA-PVA1 to DA-PVA17 and that, instead of adipic dihydrazide, N-aminopolyacrylamide (made by Otsuka Chemical Co., Ltd., trade name: APA P-280) was used.

Comparative Example 18

An inkjet recording material was produced in the same manner as in Example 28 except that the DA-PVA resin was changed from DA-PVA1 to DA-PVA19.

Comparative Example 19

An inkjet recording material was produced in the same manner as in Example 28 except that the DA-PVA resin was changed from DA-PVA1 to DA-PVA21.

The physical properties of the inkjet recording materials of Examples and Comparative Examples prepared as above were evaluated as follows. The results are shown in Table 4.

Surface Strength

To the surface of the ink accepting layer of each inkjet recording material prepared above, a mending tape (18 mm in width) made by Sumitomo 3M was attached. After peeling off the tape, the degree of transfer of the coating layer to the tape was visually observed, and the surface strength was evaluated based on the following criteria.

Good: The coating layer was hardly transferred (No practical problem)

Fair: Part of the coating layer was transferred (Slightly problematic)

Poor: Most of the coating layer was transferred (Practically problematic)

Water Resistance

Water was applied to the printed characters on the inkjet recording material, and the part was rubbed with a finger. The printed part was checked for dissolution or bleeding based on the following criteria.

Good: No bleeds were observed and the shape of the characters was retained.

Fair: Bleeds were observed but the original shape was retained.

Poor: Significant bleeds were observed and the original shape was lost due to dissolution.

TABLE 4

| | DA-PVA resin | Cross-linking agent | Evaluation of physical properties: Surface strength | Water resistance |
|---|---|---|---|---|
| Example 28 | DA-PVA1 | ADH | Good | Good |
| Example 29 | DA-PVA1 | SC | Good | Good |
| Example 30 | DA-PVA3 | APA | Good | Good |
| Example 31 | DA-PVA5 | ADH | Good | Good |
| Example 32 | DA-PVA6 | ADH | Good | Good |
| Example 33 | DA-PVA7 | ADH | Good | Good |
| Comparative Example 16 | DA-PVA15 | ADH | Fair | Fair |
| Comparative Example 17 | DA-PVA17 | APA | Fair | Fair |
| Comparative Example 18 | DA-PVA19 | ADH | Poor | Poor |
| Comparative Example 19 | DA-PVA21 | ADH | Poor | Poor |

Crossiinking agents

ADH: adipic dihydrazide

SC: biuretly-tri(hexamethylenesemicarbazide) (made by Asahi Kasei Chemicals Corp., trade name: Hardener SC)

APA: N-aminopolyacrylamide (made by Otsuka Chemical Co., Ltd., trade name: APA P-280)

The results in Table 4 show that the inkjet recording materials of Examples 28 to 33, in which uniform introduction of diacetone acrylamide was achieved as a result of using the DA-PVA resins of the present invention, were superior to those of Comparative Examples 16 to 19 in terms of water resistance and surface strength.

Use for Films

Next, the use of the DA-PVA resins obtained in the above Examples and Comparative Examples as films easily soluble in cold water and gas barrier films will be described by further Examples and Comparative Examples, but such use is not limited to the examples shown below.

Films Easily Soluble in Cold Water

Examples 34 to 39

The powder of each DA-PVA resin obtained in the Examples was dissolved in water to give a 5 to 10-6 aqueous solution. The solution was casted on PET films each having a flat, smooth surface, and then dried to give films with a thickness of about 30 μm or about 100 μm.

Comparative Example 20

Films were produced by the same procedure as in Examples 34 to 39 except that, instead of the DA-PVA resin powder, those obtained in the Comparative Examples were used.

The physical properties of the films of Examples and Comparative Examples prepared as above were evaluated as follows. The results are shown in Table 5.

Transparency

The obtained film of about 100 μm in thickness was visually observed, and the transparency was evaluated based on the following criteria.

Good: The film was transparent, such that characters were clearly visible through it.

Fair: The film was slightly cloudy, such that characters were visible through it but were blurred.

Poor: The film was cloudy, such that characters were not easily visible through it.

Water Solubility

A 1 cm×1 cm piece was cut out from the obtained film with a thickness of about 30 and immersed in water at 20° C. The time to complete dissolution of the film (time required for dissolution) was measured.

TABLE 5

| | DA-PVA resin | Evaluation of physical properties | |
|---|---|---|---|
| | | Transparency | Time required for dissolution (sec) |
| Example 34 | DA-PVA1 | Good | 45 |
| Example 35 | DA-PVA2 | Good | 40 |
| Example 36 | DA-PVA3 | Good | 40 |
| Example 37 | DA-PVA9 | Good | 37 |
| Example 38 | DA-PVA12 | Good | 15 |
| Example 39 | DA-PVA13 | Good | 16 |
| Comparative Example 20 | DA-PVA19 | Fair | 55 |

The results in Table 5 show that films of Examples 34 to 39, in which uniform introduction of diacetone acrylamide was achieved as a result of using the DA-PVA resins of the present invention, were superior to that of Comparative Example 20 in terms of transparency and water solubility.

Gas Barrier Films

Example 40

To 100 parts of a 15% aqueous solution of a DA-PVA resin (DA-PVA1), an 8% aqueous solution of adipic dihydrazide was added. The liquid mixture was applied onto one surface of a biaxially-stretched polyethylene terephthalate film having a thickness of 12 μm with the use of a bar coater, and was dried at 150° C. for 1 minute to produce a laminated film having a coating film with a thickness of 2 μm.

Example 41

A laminated film was produced in the same manner as in Example 40 except that, instead of adipic dihydrazide, biuretly-tri(hexamethylenesemicarbazide) (made by Asahi Kasei Chemicals Corp., trade name: Hardener SC, 50% aqueous solution) was used.

Example 42

A laminated film was produced in the same manner as in Example 40 except that the DA-PVA resin was changed from DA-PVA1 to DA-PVA3.

Example 43

A laminated film was produced in the same manner as in Example 40 except that instead of adipic dihydrazide, N-aminopolyacrylamide (made by Otsuka Chemical Co., Ltd., trade name: APA P-280) was used.

Example 44

A laminated film was produced in the same manner as in Example 40 except that the DA-PVA resin was changed from DA-PVA1 to DA-PVA6.

Comparative Example 21

A laminated film was produced in the same manner as in Example 40 except that the DA-PVA resin was changed from DA-PVA1 to DA-PVA15.

Comparative Example 22

A laminated film was produced in the same manner as in Example 40 except that the DA-PVA resin was changed from DA-PVA1 to DA-PVA15 and that, instead of adipic dihydrazide, biuretly-tri(hexamethylenesemicarbazide) (made by Asahi Kasei Chemicals Corp., trade name: Hardener SC, 50% aqueous solution) was used.

Comparative Example 23

A laminated film was produced in the same manner as in Example 40 except that the DA-PVA resin was changed from DA-PVA1 to DA-PVA17.

Comparative Example 24

A laminated film was produced in the same manner as in Example 40 except that the DA-PVA resin was changed from DA-PVA1 to DA-PVA17 and that, instead of adipic dihydrazide, N-aminopolyacrylamide (made by Otsuka Chemical Co., Ltd., trade name: APA P-280) was used.

Comparative Example 25

A laminated film was produced in the same manner as in Example 40 except that the DA-PVA resin was changed from DA-PVA1 to DA-PVA19.

The physical properties of the laminated films of Examples and Comparative Examples prepared as above were evaluated as follows. The results are shown in Table 6.

Water Resistance

The laminated film was immersed in a hot water at 95° C. for 30 minutes. The condition of the coating film was observed and evaluated based on the following criteria.

Good: The coating was not sticky.

Fair: The coating was somewhat sticky.

Poor: The coating was highly sticky and part of the coating is dissolved out.

Gas Barrier Performance

The oxygen permeation (cc/$m^2$·da·atm) of the laminated film was measured under the conditions of a temperature of 20° C. and a relative humidity of 65% or 85% using an oxygen permeation testing system (made by Mocon Inc.), and evaluated based on the following criteria.

Excellent: 10 or less

Good: higher than 10 and not higher than 30

Fair: higher than 30 and not higher than 80

Poor: higher than 80

TABLE 6

| | DA-PVA resin | Cross-linking agent | Evaluation of physical properties | | |
|---|---|---|---|---|---|
| | | | Water resistance | Oxygen permeation | |
| | | | | 65% | 85% |
| Example 40 | DA-PVA1 | ADH | Good | Excellent | Good |
| Example 41 | DA-PVA1 | SC | Good | Excellent | Good |
| Example 42 | DA-PVA3 | ADH | Good | Excellent | Good |
| Example 43 | DA-PVA1 | APA | Good | Excellent | Good |
| Example 44 | DA-PVA6 | ADH | Good | Excellent | Good |
| Comparative Example 21 | DA-PVA15 | ADH | Fair | Good | Fair |
| Comparative Example 22 | DA-PVA15 | SC | Fair | Excellent | Fair |
| Comparative Example 23 | DA-PVA17 | ADH | Poor | Good | Poor |

TABLE 6-continued

| | DA-PVA resin | Cross-linking agent | Evaluation of physical properties Water resistance | Oxygen permeation 65% | 85% |
|---|---|---|---|---|---|
| Comparative Example 24 | DA-PVA17 | APA | Fair | Good | Poor |
| Comparative Example 25 | DA-PVA19 | ADH | Poor | Good | Poor |

Crosslinking agents
ADH: adipic dihydrazide
SC: biuretly-tri(hexamethylenesemicarbazide) (made by Asahi Kasei Chemicals Corp., trade name: Hardener SC)
APA: N-aminopolyacrylamide (made by Otsuka Chemical Co., Ltd., trade name: APAP-280)

The results in Table 6 show that films of Examples 40 to 44, in which uniform introduction of diacetone acrylamide was achieved as a result of using the DA-PVA resins of the present invention, were superior to those of Comparative Examples 21 to 25 in terms of water resistance and gas barrier performance.

Aqueous Gels

Example 45

In 90 g of water, 10 g of a DA-PVA resin (DA-PVA1) was dissolved. To this, 5 g of a 10% aqueous solution of adipic dihydrazide was added, and the mixture was thoroughly stirred to give a uniform liquid mixture. The obtained liquid mixture was poured into a mold having a length of 3 cm, a width of 4 cm, and a thickness of 1 cm, and left to stand at 25° C. for 10 hours for gelation to give an aqueous gel.

Example 46

An aqueous gel was produced in the same manner as in Example 45 except that instead of adipic dihydrazide, N-aminopolyacrylamide (made by Otsuka Chemical Co., Ltd., trade name: APA P-280) was used.

Example 47

In 85 g of water, 15 g of a DA-PVA resin (DA-PVA10) was dissolved. To this, 3 g of a 10% aqueous solution of N-aminopolyacrylamide (made by Otsuka Chemical Co., Ltd., trade name: APA P-280) was added, and the mixture was thoroughly stirred to give a uniform liquid mixture. The obtained liquid mixture was poured into a mold having a length of 3 cm, a width of 4 cm, and a thickness of 1 cm, and left to stand at 25° C. for 10 hours for gelation to give an aqueous gel.

Example 48

An aqueous gel was produced in the same manner as in Example 45 except that the DA-PVA resin was changed from DA-PVA1 to DA-PVA11 and that, instead of adipic dihydrazide, biuretly-tri(hexamethylenesemicarbazide) (made by Asahi Kasei Chemicals Corp., trade name: Hardener SC, 50% aqueous solution) was used.

Comparative Example 26

An aqueous gel was produced in the same manner as in Example 45 except that the DA-PVA resin was changed from DA-PVA1 to DA-PVA15.

Comparative Example 27

An aqueous gel was produced in the same manner as in Example 45 except that the DA-PVA resin was changed from DA-PVA1 to DA-PVA18.

The physical properties of the aqueous gels of Examples and Comparative Examples prepared as above were evaluated as follows. The results are shown in Table 7.

Transparency

The obtained aqueous gel was visually observed in the thickness direction, and the transparency was evaluated based on the following criteria.

Good: The aqueous gel was transparent, such that characters were clearly visible through it.

Fair: The aqueous gel was slightly cloudy, such that characters were visible through it but were blurred.

Poor: The aqueous gel was cloudy, such that characters were not easily visible through it.

TABLE 7

| | DA-PVA resin | Crosslinking agent | Evaluation of physical properties Transparency |
|---|---|---|---|
| Example 45 | DA-PVA1 | ADH | Good |
| Example 46 | DA-PVA1 | APA | Good |
| Example 47 | DA-PVA10 | APA | Good |
| Example 48 | DA-PVA11 | SC | Good |
| Comparative Example 26 | DA-PVA15 | ADH | Fair |
| Comparative Example 27 | DA-PVA18 | ADH | Poor |

Crosslinking agents
ADH: adipic dihydrazide
SC: biuretly-tri(hexamethylenesemicarbazide) (made by Asahi Kasei Chemicals Corp., trade name: Hardener SC)
APA: N-aminopolyacrylamide (made by Otsuka Chemical Co., Ltd., trade name: APA P-280)

The results in Table 7 show that aqueous gels of Examples 45 to 48, in which uniform introduction of diacetone acrylamide was achieved as a result of using the DA-PVA resins of the present invention, were superior to those of Comparative Examples 26 to 27 in terms of transparency.

INDUSTRIAL APPLICABILITY

According to the present invention, in the copolymerization of an aliphatic vinyl ester and diacetone acrylamide, diacetone acrylamide is uniformly introduced by adjusting the ratio of the yield at the end of the polymerization to the yield at the end of the later addition of diacetone acrylamide to within the range defined in the present invention, and thereby a polyvinyl alcohol resin of which an aqueous solution is highly transparent is obtained. In addition, since the ratio of the remaining diacetone acrylamide is low, the resin is also industrially advantageous. The polyvinyl alcohol resin of the present invention, in which uniform introduction of diacetone acrylamide is achieved, is highly soluble in water, and when a crosslinking agent is added, the resin exhibits excellent in water resistance and gas barrier performance. The polyvinyl alcohol resin of the present invention can be used as a coating agent for a thermal recording material or an inkjet recording material, a protection film for a light-sensitive flat printing plate, a film easily soluble in cold water for detergent or pesticide packaging, a gas barrier film for food packaging, or an aqueous gel as a fragrance, a deodorizer or a refrigerant or for immobilization of an enzyme or a microorganism.

The invention claimed is:

1. A method for producing a polyvinyl alcohol resin, comprising the steps of copolymerizing an aliphatic vinyl ester (A) with diacetone acrylamide (B) to obtain a copolymer, wherein at least a part of the diacetone acrylamide (B) is added at a later stage, in the presence of a polymerization catalyst in an alcohol solvent, so that a ratio (a)/(b) of a polymerization yield at the end of a polymerization (a) to a polymerization yield at the end of the later addition (b) of diacetone acrylamide (B) is in the range of 1.01 to 1.10, and saponifying the copolymer to obtain the polyvinyl alcohol resin.

2. The method for producing the polyvinyl alcohol resin according to claim 1, wherein a weight ratio (c)/(d) of an amount of diacetone acrylamide (B) added at an earlier stage (c) to an amount of diacetone acrylamide (B) added at a later stage (d) is in the range of 0/100.0 to 15.0/85.0.

3. The method for producing the polyvinyl alcohol resin according to claim 1, wherein a weight ratio of diacetone acrylamide (B) remaining after the polymerization calculated by the formula (e)/((e)+(f)) is 0.5% or less, wherein (e) is an amount of the diacetone acrylamide (B) remaining at the end of the polymerization and (f) is an amount of the aliphatic vinyl ester (A) remaining at the end of the polymerization, and the copolymer is saponified.

4. The method for producing the polyvinyl alcohol resin according to claim 1, wherein the aliphatic vinyl ester (A) is vinyl acetate.

5. The method for producing the polyvinyl alcohol resin according to claim 2, wherein the weight ratio of diacetone acrylamide (B) remaining after the polymerization calculated by the formula (e)/((e)+(f)) is 0.5% or less, wherein (e) is an amount of the diacetone acrylamide (B) remaining at the end of the polymerization and (f) is an amount of the aliphatic vinyl ester (A) remaining at the end of the polymerization, and the copolymer is saponified.

6. The method for producing the polyvinyl alcohol resin according to claim 2, wherein the weight ratio (c)/(d) is in the range of 1.0/99.0 to 13.0/87.0.

7. A polyvinyl alcohol resin obtained by the production method according to claim 1.

8. The polyvinyl alcohol resin according to claim 7, which has a diacetone acrylamide (B) unit content of 1.0 to 15.0 mol %, a saponification degree of 80.0 mol % or higher, a viscosity of 2.0 mPa·s or higher in a 4% aqueous solution, and a transparency of 90% or higher in a 4% aqueous solution.

9. A coating agent comprising the polyvinyl alcohol resin according to claim 7.

10. A coated product obtained by coating a base material with the coating agent according to claim 9.

11. A thermal recording material obtained by coating a base material with the coating agent according to claim 9.

12. An ink-jet recording material obtained by coating a base material with the coating agent according to claim 9.

13. A film comprising the polyvinyl alcohol resin according to claim 7.

14. An aqueous gel comprising the polyvinyl alcohol resin according to claim 7.

* * * * *